United States Patent
Lee et al.

(10) Patent No.: US 9,237,455 B2
(45) Date of Patent: Jan. 12, 2016

(54) METHOD FOR ALLOCATING WIRELESS RESOURCES IN A WIRELESS ACCESS SYSTEM, AND APPARATUS THEREFOR

(75) Inventors: Sangwook Lee, Anyang-si (KR); Manyoung Jung, Anyang-si (KR); Suhwan Lim, Anyang-si (KR); Yoonoh Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 14/115,555

(22) PCT Filed: Jun. 15, 2012

(86) PCT No.: PCT/KR2012/004756
§ 371 (c)(1),
(2), (4) Date: Nov. 4, 2013

(87) PCT Pub. No.: WO2012/173434
PCT Pub. Date: Dec. 20, 2012

(65) Prior Publication Data
US 2014/0080501 A1   Mar. 20, 2014

Related U.S. Application Data

(60) Provisional application No. 61/497,064, filed on Jun. 15, 2011.

(51) Int. Cl.
| | |
|---|---|
| H04W 72/00 | (2009.01) |
| H04W 16/14 | (2009.01) |
| H04W 72/04 | (2009.01) |
| H04W 72/08 | (2009.01) |

(52) U.S. Cl.
CPC .............. *H04W 16/14* (2013.01); *H04W 72/04* (2013.01); *H04W 72/0453* (2013.01); *H04W 72/082* (2013.01)

(58) Field of Classification Search
None
See application file for complete search history.

(56) References Cited

U.S. PATENT DOCUMENTS 8,532,041 B1 * 9/2013 Lambert et al. ............... 370/329
2008/0014880 A1   1/2008 Hyon et al.
(Continued)

FOREIGN PATENT DOCUMENTS

| KR | 10-2008-0007047 A | 1/2008 |
| KR | 10-2010-0040591 A | 4/2010 |
| WO | WO 2010/027308 A1 | 3/2010 |

*Primary Examiner* — Erika A Washington
(74) *Attorney, Agent, or Firm* — Birch, Stewart, Kolasch & Birch, LLP

(57) ABSTRACT

The present invention relates to a method for allocating wireless resources in a wireless access system that supports an operation in an unlicensed band, as well as to an apparatus for the method. More particularly, a method for allocating wireless resources in a wireless access system that supports a television white space (TV WS) band comprises the steps of: allocating, to a terminal and from among TV WS bands, available frequency bands which are not used by a licensed device; if a receiving band of another device exists in a neighboring band of the available frequency bands, setting up a guard band in a portion of the band adjacent to the neighboring band from among the available frequency bands; allocating wireless resources to a terminal in a frequency band from among the available frequency bands, excluding the guard band; and receiving uplink data from the terminal through the wireless resources, wherein the guard band is determined using the allocation location of the wireless resources, the amount of wireless resources, and the transmission power of the terminal.

10 Claims, 20 Drawing Sheets

(56) References Cited

U.S. PATENT DOCUMENTS

2010/0093360 A1  4/2010  Choi et al.
2011/0165903 A1*  7/2011  Selen et al. .................. 455/509
2011/0300891 A1*  12/2011  Deb et al. ..................... 455/510
2011/0307612 A1*  12/2011  Junell et al. .................. 709/226

* cited by examiner

FIG. 12
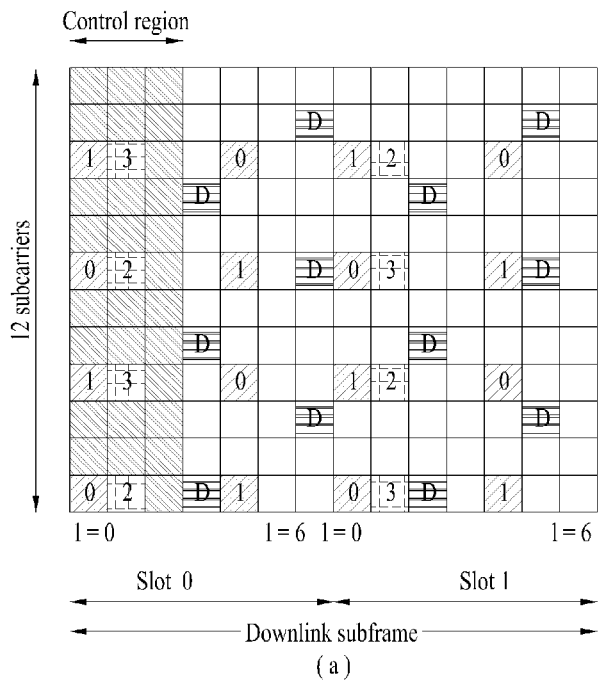
(a)
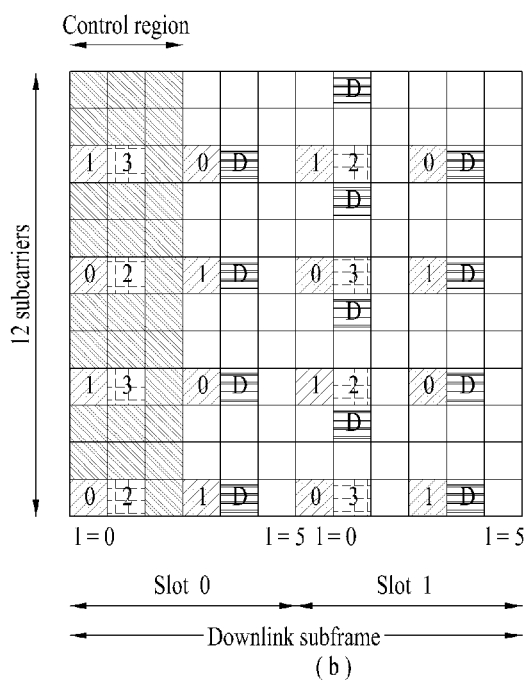
(b)

METHOD FOR ALLOCATING WIRELESS RESOURCES IN A WIRELESS ACCESS SYSTEM, AND APPARATUS THEREFOR

CROSS REFERENCE TO RELATED APPLICATIONS

This application is the National Phase of PCT/KR2012/004756 filed on Jun. 15, 2012, which claims priority under 35 U.S.C. 119(e) to U.S. Provisional Application No. 61/497,064 filed on Jun. 15, 2011, all of which are hereby expressly incorporated by reference into the present application.

TECHNICAL FIELD

The present invention relates to a wireless access system, and more particularly, to a method of allocating a radio resource in a wireless access system supporting an operation in an unlicensed band and an apparatus therefor.

BACKGROUND ART

A standard for a wireless local area network (WLAN) technology has been developed as IEEE (Institute of Electrical and Electronics Engineers) 802.11 standard. IEEE 802.11a or IEEE 802.11b uses an unlicensed band in 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps in a manner of applying Orthogonal Frequency Division Multiplexing (OFDM) in 2.4 GHz. IEEE 802.11n provides transmission speed of 300 Mbps for 4 spatial streams in a manner of applying Multiple Input Multiple Output-OFDM (MIMO-OFDM). IEEE802.11n supports a channel bandwidth up to 40 MHz. In this case, IEEE802.11n provides transmission speed of 600 Mbps.

Meanwhile, a TV white space (TV WS) is a frequency assigned to a broadcast TV and includes an Ultra High Frequency (UHF) band and a Very High Frequency (VHF). The TV WS means a frequency band permitted to an unlicensed device to use the frequency under a condition that the unlicensed device does not impede a communication of a licensed device operating in the corresponding frequency band. In particular, a device operating as the unlicensed device can use an available channel or an available frequency band not used by the licensed device in the corresponding frequency band. In this case, the licensed device may include a TV, a wireless microphone, and the like. The licensed device may be called a licensed user, an incumbent user, or a primary user and the like.

The unlicensed device wishing to use the TV WS should provide a protection function for the licensed device. Hence, the unlicensed device should check whether the licensed device occupies a corresponding band before starting a signal transmission in the TV WS to obtain available channel information.

To this end, the unlicensed device can check whether the corresponding band is used by the licensed device in a manner of performing a spectrum sensing. A spectrum sensing mechanism includes an energy detection scheme, a feature detection scheme, and the like. If strength of a signal received from a specific channel is greater than a prescribed value or a DTV (digital TV) preamble is detected, the unlicensed device can judge that the specific channel is currently used by the licensed device. And, if it is judged that the licensed device currently uses a channel adjacent to the channel currently using, the unlicensed device should lower a transmit power depending on an amount of interference emitted to a neighboring band in some cases.

If the unlicensed device depends on a frequency sensing only to obtain available channel information in the TV WS, the burden resulted from sensing for an operation in the TV WS laid on the unlicensed device increases and a procedure may be delayed. Hence, the unlicensed device may access a geo-location database via the internet or a dedicated network and may be then able to obtain channel list information available in a corresponding area. The geo-location database is a database configured to store and manage information on registered licensed devices, geographical location of the licensed devices, and channel usage information that changes dynamically according to time of a channel use.

DISCLOSURE OF THE INVENTION

Technical Tasks

One object of the present invention is to provide a method of efficiently allocating a radio resource to a user equipment operating as an unlicensed device in a wireless access system supporting an operation in an unlicensed band and an apparatus therefor.

Another object of the present invention is to provide a method of minimizing interference leaked to a neighboring band due to a transmit power of a user equipment emitted to a band except an available frequency band of an unlicensed band in which the user equipment operates and apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of allocating a radio resource in a wireless access system supporting a TV white space (TV WS) band includes the steps of assigning an available frequency band not used by a licensed device among the TV WS band to a user equipment, if a reception band of a different device exists in a band adjacent to the available frequency band, setting a guard band to a part of a band adjacent to the band among the available frequency band, allocating the radio resource to the user equipment in the available frequency band except the guard band, and receiving uplink data from the user equipment via the radio resource, wherein the guard band is determined using an allocation position of the radio resource, an amount of the radio resource, and transmit power of the user equipment.

To further achieve these and other advantages and in accordance with the purpose of the present invention, a base station allocating a radio resource in a wireless access system supporting a TV white space (TV WS) band includes a radio frequency (RF) unit configured to transmit/receive a radio signal and if an available frequency band not used by a licensed band among the TV WS band is assigned to a user equipment and a reception band of a different device exists in a band adjacent to the available frequency band, a processor configured to set a guard band to a part of a band adjacent to the band among the available frequency band, the processor configured to allocate the radio resource to the user equipment in the available frequency band except the guard band, the processor configured to receive uplink data from the user equipment via the radio resource, wherein the guard band is determined using an allocation position of the radio resource, an amount of the radio resource, and transmit power of the user equipment.

Preferably, the user equipment receives information on whether the reception band of the different device exists in the band adjacent to the available frequency band from the user equipment or a network.

Preferably, the information on whether the reception band of the different device exists in the band adjacent to the available frequency band received from the user equipment indicates whether a power value measured for the band adjacent to the available frequency band is within a predetermined range.

Preferably, whether the reception band of the different device exists in the band adjacent to the available frequency band is determined via usage information of the TV WS band shared by a different base station.

Preferably, the guard band is set to the part of the band adjacent to a prescribed one band only among both bands adjacent to the available frequency band.

Preferably, a transmit power of the user equipment corresponds to maximum transmit power permitted to the user equipment.

It is to be understood that both the foregoing general description and the following detailed description are exemplary and explanatory and are intended to provide further explanation of the invention as claimed.

Advantageous Effects

According to embodiment of the present invention, it is able to efficiently allocate a radio resource to a user equipment operating as an unlicensed device in a wireless access system supporting an operation in an unlicensed band.

According to embodiment of the present invention, it is able to minimize interference leaked to a neighboring band due to a transmit power of a user equipment emitted to a band except an available frequency band of an unlicensed band in which the user equipment operates.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 12 is a diagram of a reference signal pattern mapped to a downlink resource block (RB) pair defined by 3GPP LTE system;

BEST MODE

Mode for Invention

Figure 1:
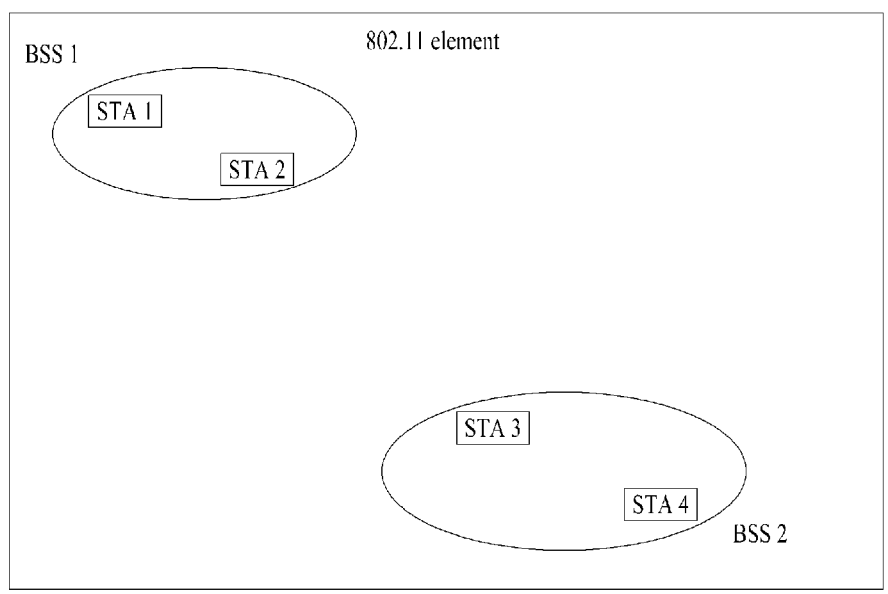
FIG. 1 is a diagram for an example of a configuration of a wireless local area network system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a user equipment. In this case, the base station means a terminal node of a network directly performing a communication with the user equipment. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. A relay can be replaced by such a terminology as a relay node (RN), a relay station (RS), and the like. And, 'terminal' can be replaced by such a terminology as a user equipment (UE), a mobile station (MS), a mobile subscriber station (MSS), a subscriber station (SS), a station (STA), and the like.

Specific terminologies used in the following description are provided to help the understanding of the present invention and can be modified to a different form in a scope of not deviating from the technical idea of the present invention.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and adopts OFDMA in downlink and adopts SC-FDMA in uplink. LTE-A (LTE-Advanced) is an evolved version of 3GPP LTE.

1. The Generals of a Wireless Local Area Network (WLAN) System to which the Present Invention is Applicable FIG. 1 is a diagram for an example of a configuration of a wireless local area network system.

Referring to FIG. 1, a wireless local area network (WLAN) system includes at least one basic service set (BSS). The BSS is a set of stations (STA) capable of communicating with each other by successfully performing synchronization. FIG. 1 exemplifies two BSSs and two STAs accessed each of the BSSs, respectively. In FIG. 1, an oval representation indicates a BSS coverage area and is called a basic service area (BSA). If an STA moves beyond the BSA, the STA cannot directly communicate with a different STA existing in the BSA anymore.

A BSS is divided into an independent BSS (IBSS) and an infrastructure BSS. The IBSS is a most basic type of a wireless local area network (WLAN) system. The BSSs depicted in FIG. 1 indicates IBSSs. A direct communication between STAs is possible in the IBSS and an operation type between STAs is called an ad hoc network.

In order for an STA to access a BSS, the STA should perform a procedure of synchronizing with a base station. Moreover, the STA should be associated with the base station to access all services of an infrastructure BSS. This association procedure is dynamically performed and includes a use of a distribution system service (DSS).

Figure 2:
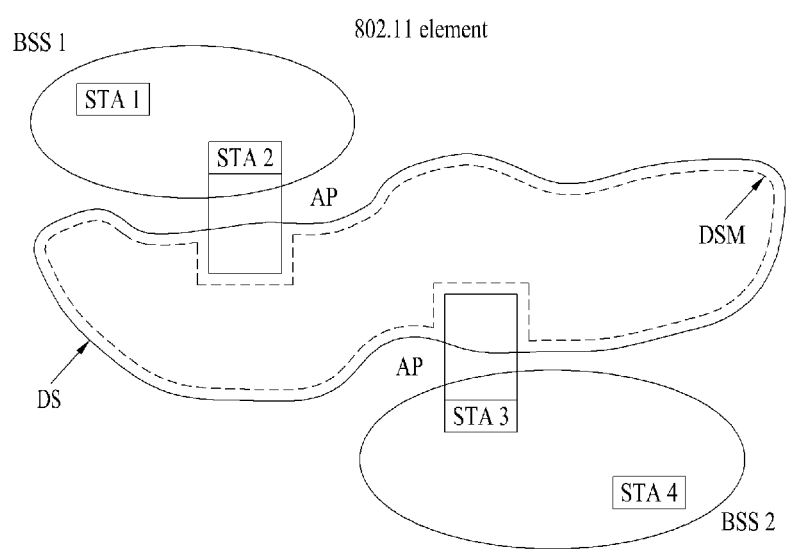
FIG. 2 is a diagram for a different example of a configuration of a wireless local area network system.

FIG. 2 is a diagram for a different example of a configuration of a wireless local area network system.

A direct distance capable of being supported between an STA and an STA may be physically restricted. Although the distance may be sufficient depending on a network, coverage expansion may be required since the distance is not sufficient. Hence, a BSS can be configured as an element in an expanded form of a network consisted of a plurality of BSSs. As mentioned in the foregoing description, an architecture element used to connect BSSs with each other is called a distribution system (DS).

The DS is a mechanism for connecting a plurality of APs with each other and the DS is not necessarily to be a network. If the DS is able to provide a prescribed distribution service, there is no limit for a form of the DS. For instance, the DS may correspond to such a wireless network as a mesh network or may correspond to a physical structure connecting APs with each other.

A distribution system medium (DSM) and a wireless medium (WM) can be logically classified in a wireless local area network (WLAN) system. Each of the logical media is used for a purpose different from each other by an element different from each other of architecture. Mobility of a device is supported by the DS in a manner of providing a necessary logical service for seamless integration of a plurality of BSSs and management of address mapping to a destination.

An access point (AP) is an entity enabling an associated STA to access a distribution system via a WM. Data moves between a BSS and the DS via the AP. In this case, since all APs may become an STA, the AP is also an entity including an address. Yet, an address used by the AP for a communication via the WM and an address used by the AP for a communication via the DSM are not necessary to be identical to each other.

Figure 3:
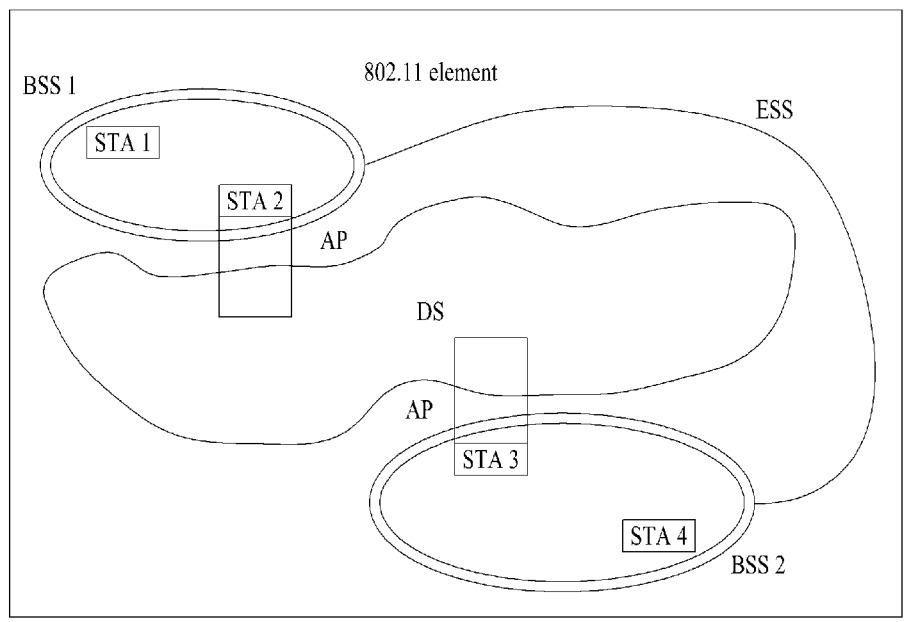
FIG. 3 is a diagram for a further different example of a configuration of a wireless local area network system.

FIG. 3 is a diagram for a further different example of a configuration of a wireless local area network system.

A wireless network of a random size and complexity can be formed using a DS and a BSS. This sort of network type is called an extended service set (ESS) network. The ESS means a plurality of BSSs connected to each other via the DS and does not include the DS. Since the ESS network includes a logical link control (LLC) layer identical to that of an IBSS, an STA included in the ESS can move from one BSS to another BSS within an identical ESS in a manner of being transparent to the LLC.

A plurality of BSSs can be partly overlapped to form a physically contiguous coverage. And, since there is no limitation for a logical distance between BSSs, a plurality of the BSSs may not be physically connected to each other. Moreover, a plurality of the BSSs may not be physically connected to each other to avoid unnecessary overlap. In case that an ad hoc network operates in a position where an ESS network is included, in case that physically overlapped wireless local area network systems are configured with a structure different from each other, or in case that a plurality of different access or security policies are required in an identical position, one (or more) IBSS or an ESS network may exist in a physically identical space as one (or more) ESS network.

Figure 4:
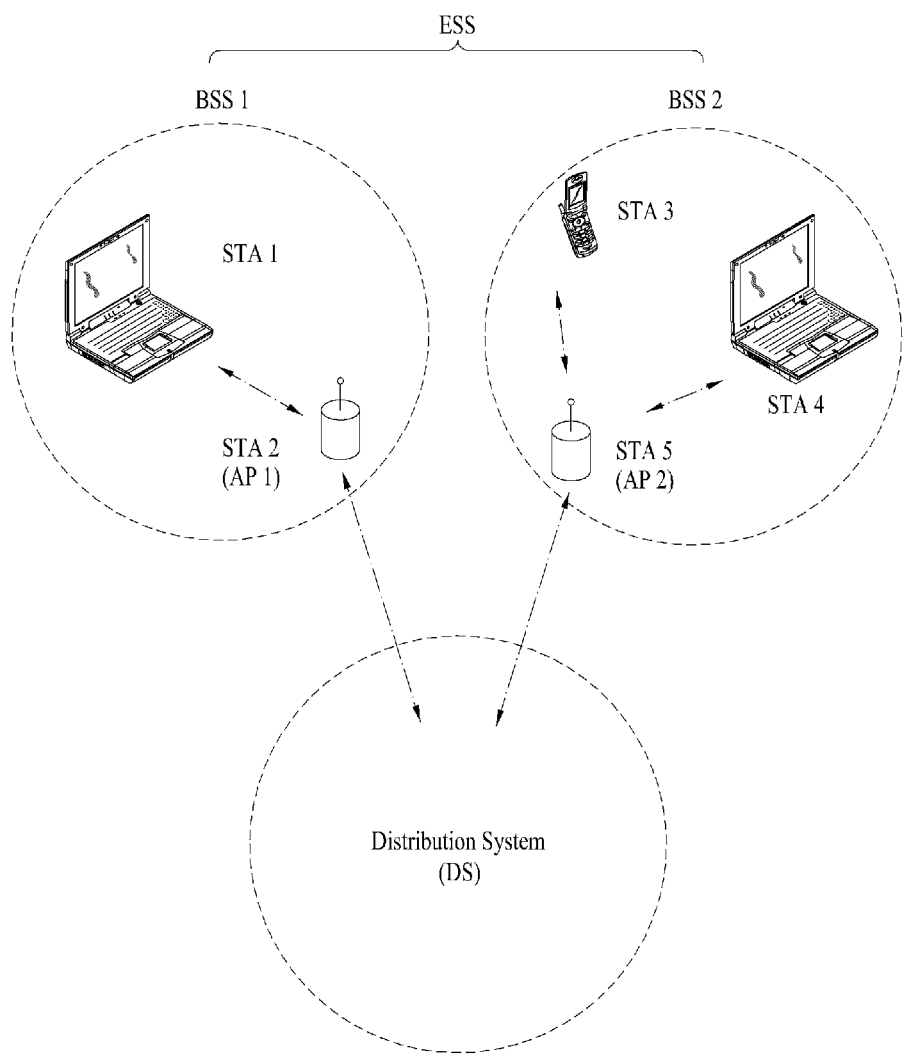
FIG. 4 is a diagram for a further different example of a configuration of a wireless local area network system.

FIG. 4 is a diagram for a further different example of a configuration of a wireless local area network system.

FIG. 4 exemplifies an infrastructure BSS including a DS. In FIG. 4, an ESS consists of a BSS 1 and a BSS 2. An STA is a logical entity including a medium access control (MAC) and a physical layer interface for a wireless medium. The STA includes an AP STA (AP station) and a non-AP STA (Non-AP station). A mobile terminal operated by a user corresponds to the Non-AP STA among the STAs. If it is simply called an STA, the STA may correspond to the Non-AP STA. The Non-AP STA may be called such a different name as a terminal, a wireless transmit/receive unit (WTRU), a user equipment (UE), a mobile station (MS), a mobile terminal, a mobile subscriber unit, and the like. And, an AP is an entity providing an STA associated to the AP with an access to a distribution system (DS) via a wireless media. The AP can be called a concentration controller, a base station (BS), a Node B, a base transceiver system (BTS), a femto BS, a site controller, and the like.

Figure 5:
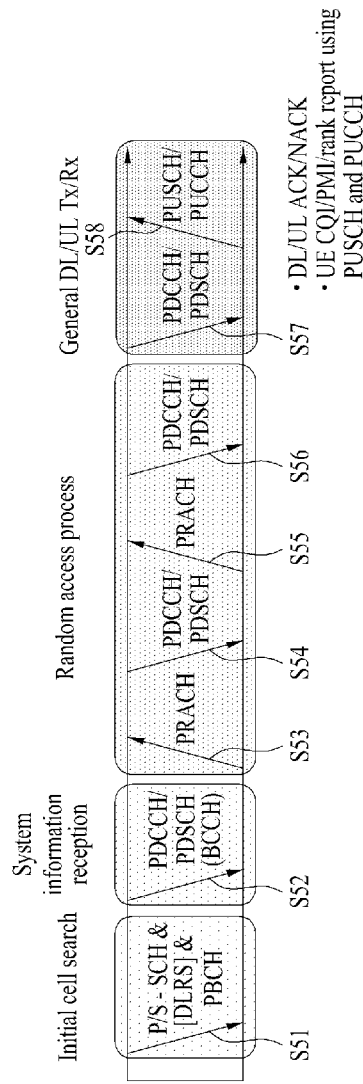
FIG. 5 is a diagram for explaining physical channels used for 3GPP LTE system and a general signal transmission method using the physical channels.

2. The Generals of 3GPP LTE/LTE-a System to which the Present Invention is Applicable 2.1. The General of System FIG. 5 is a diagram for explaining physical channels used for 3GPP LTE system and a general signal transmission method using the physical channels.

If a power of a user equipment is turned on or the user equipment enters a new cell, the user equipment may perform an initial cell search job for matching synchronization with a base station and the like [S51]. To this end, the user equipment may be synchronized with the base station in a manner of receiving a primary synchronization channel (P-SCH) and a secondary synchronization channel (S-SCH) from the base station and obtains information such as a cell ID and the like.

Subsequently, the user equipment may receive a physical broadcast channel from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S52].

Subsequently, the user equipment may be able to perform a random access procedure to complete the access to the base station [S53 to S56]. To this end, the user equipment may transmit a specific sequence as a preamble on a physical random access channel (PRACH) [S53] and may be then able to receive a response message on PDCCH and the corresponding PDSCH in response to the preamble [S54]. In case of a contention based random access, the user equipment may be able to perform a contention resolution procedure such as a transmission of an additional PRACH signal [S55] and a reception of a PDCCH signal and a PDSCH signal corresponding to the PDCCH signal [S56].

Having performed the above mentioned procedures, the user equipment may be able to perform a PDCCH and/or PDSCH signal reception [S57] and a PUSCH (physical uplink shared channel) and/or PUCCH (physical uplink control channel) signal transmission [S58] as a general uplink/downlink signal transmission procedure.

Control information transmitted to a base station by a user equipment may be commonly named uplink control information (hereinafter abbreviated UCI). The UCI may include HARQ-ACKNACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 6:
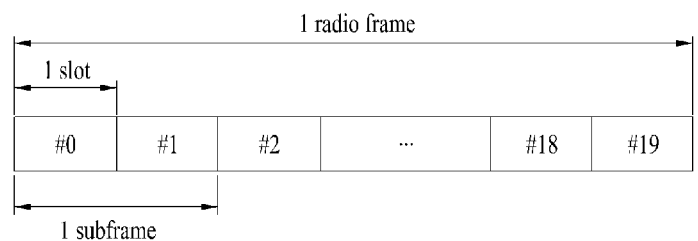
FIG. 6 is a diagram for a structure of a radio frame in 3GPP LTE system.

FIG. 6 is a diagram for a structure of a radio frame in 3GPP LTE system.

Referring to FIG. 6, A radio frame includes 10 subframes. Each of the subframes includes 2 slots in time domain. A time taken to transmit one subframe is defined as a transmission time interval (hereinafter abbreviated TTI). For instance, one subframe may have a length of 1 ms and one slot may have a length of 0.5 ms.

One slot may include a plurality of OFDM symbols in time domain. Since 3GPP LTE system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The above-described structures of the radio frame are exemplary only. And, the number of subframes included in a radio frame, the number of slots included in the subframe and the number of symbols included in the slot may be modified in various ways.

Figure 7:
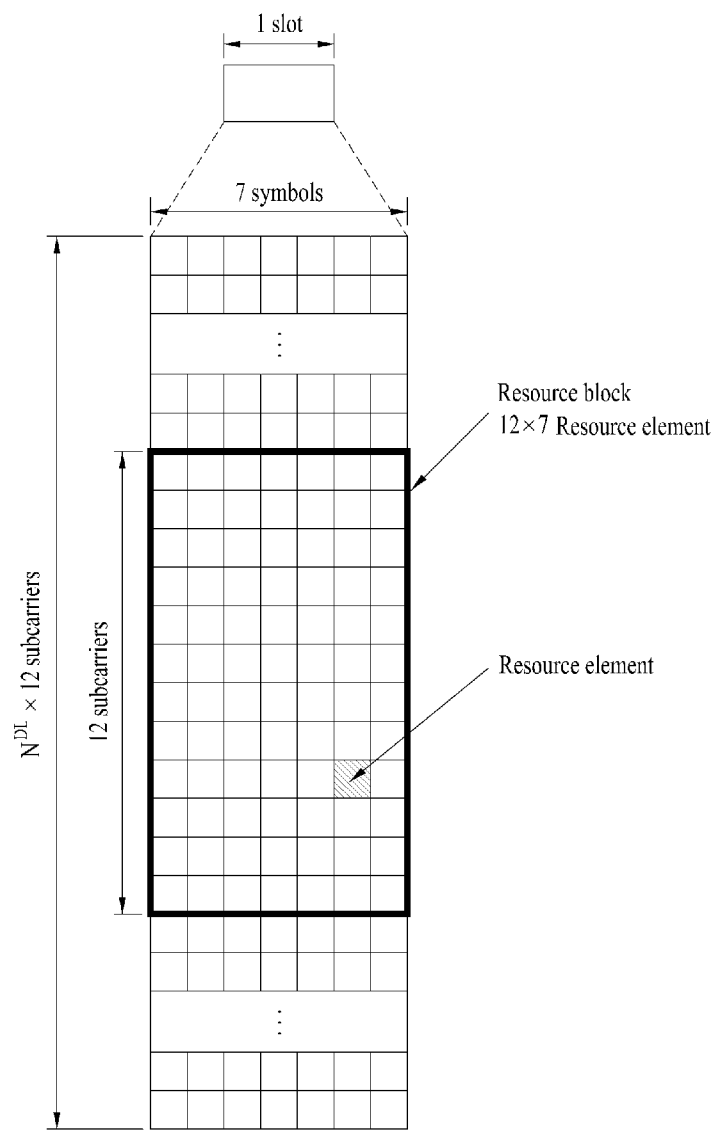
FIG. 7 is a diagram for an example of a resource grid for a downlink slot.

FIG. 7 is a diagram for an example of a resource grid for a downlink (DL) slot.

Referring to FIG. 7, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 8:
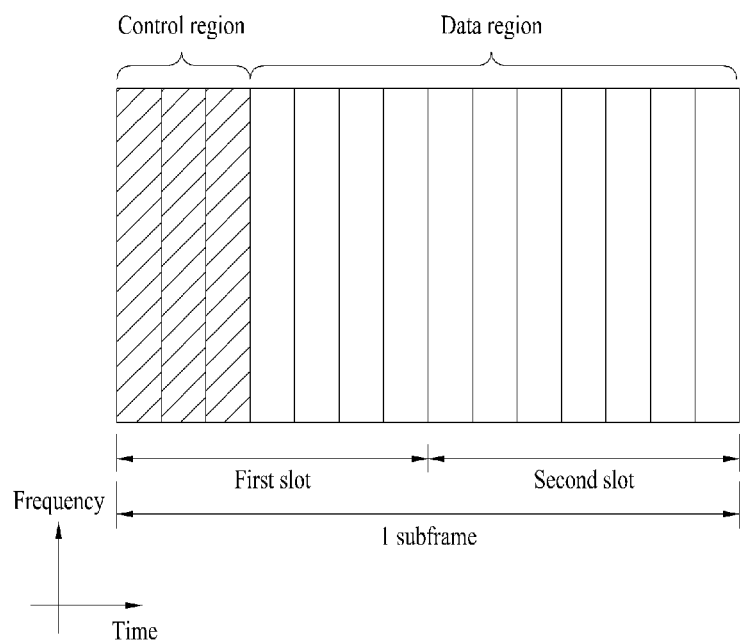
FIG. 8 is a diagram for a structure of a downlink subframe.

FIG. 8 is a diagram for a structure of a downlink subframe.

Referring to FIG. 8, Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

The PDCCH can carry resource allocation and transmission format (this is so-called DL grant) of a DL-SCH (downlink shared channel), resource allocation information (this is so-called UL grant) of a UL-SCH (uplink shared channel), paging information on a PCH (paging channel), system information on the DL-SCH, resource allocation for an upper layer control message such as a random access response carried on PDSCH, an aggregation of transmission power control commands for a individual user equipments in a random user equipment group, activation of VoIP (voice over internet protocol) and the like. A plurality of PDCCHs may be transmitted within a control region and a user equipment may be able to monitor a plurality of the PDCCHs. The PDCCH is constructed with aggregation of one or several contiguous CCEs (control channel elements). The CCE is a logical allocation unit used to provide the PDCCH with a coding rate in accordance with a status of a radio channel. The CCE corresponds to a plurality of resource element groups. The format of the PDCCH and the bit number of available PDCCH are determined in accordance with the correlation between the number of CCEs and the coding rate provided by the CCEs.

A base station determines a PDCCH format in accordance with a DCI which is to be sent to a user equipment and then attaches a CRC (cyclic redundancy check) to a control information. In this case, the CRC is masked with a unique identifier (this is called a radio network temporary identifier (hereinafter abbreviated RNTI) in accordance with an owner or usage of PDCCH. If the PDCCH is provided for a specific user equipment, the CRC can be masked with a unique identifier of a user equipment, e.g., C-RNTI (cell-RNTI). If the PDCCH is provided to a paging message, the CRC can be masked with a paging indication identifier, e.g., P-RNTI (paging-RNTI). If the PDCCH is provided for a system information, the CRC can be masked with a system information identifier, e.g., SI-RNTI (system information-RNTI). In order to indicate a random access response which is the response to a transmission of a random access preamble of a user equipment, the CRC can be masked with RA-RNTI (random access-RNTI).

Figure 9:
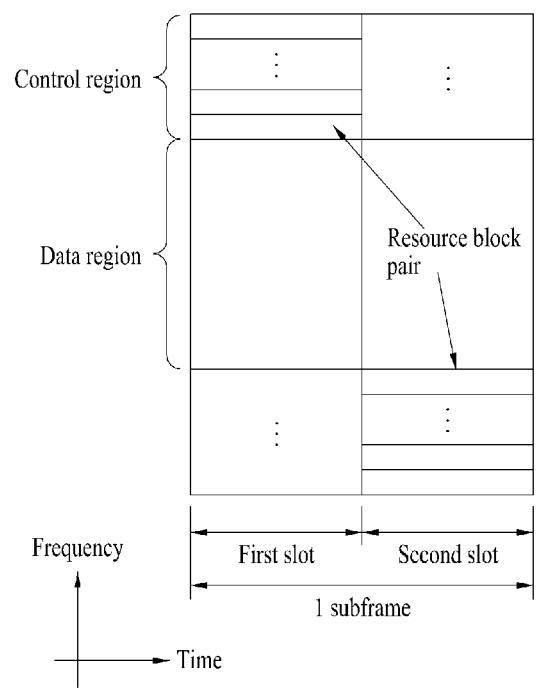
FIG. 9 is a diagram for a structure of an uplink subframe.

FIG. 9 is a diagram for a structure of an uplink subframe.

Referring to FIG. 9, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

2.2. MIMO (Multi-Input Multi-Output)

Unlike a conventional way using one transmission antenna and one reception antenna, a MIMO technology uses multiple transmission (Tx) antennas and multiple reception (Rx) antennas. In other word, the MIMO technology is a technology using multiple input/output antennas used by a transmitting end or a receiving end of a wireless communication system to achieve capacity increase or performance enhancement. In the following, 'MIMO' is called 'MIMO antenna'.

More specifically, the MIMO antenna technology does not depend on a single antenna path to receive a total complete message and completes a data by collecting a plurality of data fragments received via a plurality of antennas. Consequently, the MIMO antenna technology may increase data transfer rate within a specific system range and may enlarge a system range via a specific data transfer rate.

Since a next generation mobile communication requires far higher data transfer rate compared to a legacy mobile communication, it is expected that an efficient MIMO antenna technology is definitely required. In this situation, a MIMO communication technology is a next generation mobile communication technology capable of being widely used by a mobile communication terminal, a relay, and the like and receives attention as a technology capable of overcoming traffic limit caused by the enlargement of a data communication.

Meanwhile, among the currently studied various technologies to enhance a transfer rate, the MIMO antenna technology receives a lot of attention as a method of dramatically enhancing communication capacity and transmission/reception performance without an additional frequency assignment or power increase.

Figure 10:
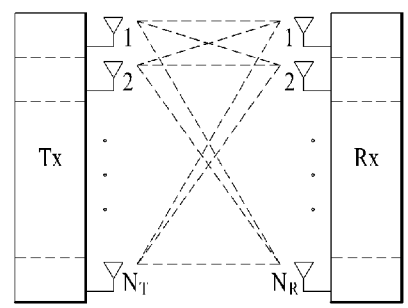
FIG. 10 is a block diagram of a general multi-antenna (MIMO) communication system.

FIG. 10 is a block diagram of a general multi-antenna (MIMO) communication system.

Referring to FIG. 10, if the number of transmitting antenna and the number of receiving antenna are simultaneously increased to $N_T$ and $N_R$, respectively, a theoretical channel transmission capacity is increased compared to a case that the plural number of antennas are only used for either the transmitting end or the receiving end. Hence, transfer rate and frequency efficiency can be dramatically enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1.

$$R_i = \min(N_T, N_R) \quad \text{[Formula 1]}$$

For instance, a MIMO communication system using 4 transmitting antennas and 4 receiving antennas may be able to theoretically obtain the transfer rate of 4 times of a single antenna system.

The MIMO antenna technology can be divided into a spatial diversity scheme for enhancing transmission reliability using symbols passed through various channel paths and a spatial multiplexing scheme for enhancing transfer rate by simultaneously transmitting a plurality of data symbols using a plurality of transmission antennas. Moreover, a study on a scheme for intending to appropriately obtain strength of each of the schemes in a manner of properly combining the two schemes with each other is actively performed.

Each of the schemes is explained in more detail in the following description.

First of all, the spatial diversity scheme includes a space-time block code scheme and a space-time Trelis coding scheme simultaneously using diversity gain and a coding gain. In general, the Trelis coding scheme is superior in a bit error rate improving performance and a code generation. Yet, the space-time block code scheme is simpler than the Trelis coding scheme in terms of calculation complexity. The spatial diversity gain can be obtained as many as the number ($N_T \times N_R$) resulted from multiplying the number of transmitting antenna ($N_T$) by the number of receiving antenna ($N_R$).

Secondly, the spatial multiplexing scheme is the scheme transmitting data rows different from each other in each of transmitting antennas. In this case, interference occurs at a receiver between data simultaneously transmitted from a transmitter. The receiver receives the data in a manner of eliminating the interference using an appropriate signal processing scheme. A noise eliminating scheme used for the above situation may include an MLD (maximum likelihood detection) receiver, a ZF (zero-forcing) receiver, an MMSE (minimum mean square error) receiver, a D-BLAST (Diagonal-Bell Laboratories Layered Space-Time), a V-BLAST (Vertical-Bell Laboratories Layered Space-Time), and the like. In particular, in case that a transmitting end is able to know channel information, a SVD (singular value decomposition) scheme and the like can be used.

Thirdly, there exists a scheme combined the spatial diversity and the spatial multiplexing. In case of obtaining the spatial diversity gain only, performance improvement gain is gradually saturated according to the increase of the order of diversity. In case of obtaining the spatial multiplexing gain only, transmission reliability is degraded in a radio channel. Schemes for obtaining two kinds of gains while solving the aforementioned problems have been studied and may include a double space-time block code (double-STTD) scheme, a space-time BICM (STBICM) scheme, and the like.

In order to explain the aforementioned communication method in a MIMO antenna system with a detailed method, a mathematical modeling is described as follows.

First of all, assume that there exist the $N_T$ number of transmitting antennas and the $N_R$ number of receiving antennas as shown in FIG. 10.

First of all, if we look into a transmission signal, since the maximum number of information capable of being transmitted corresponds to $N_T$ in case that there exist the $N_T$ number of transmitting antennas, the transmission signal can be represented as a vector as follows.

$$s = [s_1, s_2, \ldots, s_{N_T}]^T \qquad \text{[Formula 2]}$$

Meanwhile, for each of the transmission informations $s_1$, $s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, if $\hat{s}$ is represented using a diagonal matrix P, it can be represented as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Meanwhile, the $N_T$ number of transmission signal $x_1$, $x_2, \ldots, x_{N_T}$, which is practically transmitted, is configured in a manner of applying a weighted matrix W to the transmit power adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Formula 5]}$$

$$W\hat{s} = WPs$$

In this case, $W_{ij}$ means a weighting between an $i^{th}$ transmitting antenna and $j^{th}$ transmission information. The W is called the weighted matrix or a precoding matrix.

Meanwhile, the aforementioned transmission signal (x) can be considered in a manner of dividing into a case of using the spatial diversity and a case of using the spatial multiplexing.

In case of using the spatial multiplexing, since the signals different from each other are transmitted in a manner of being multiplexed, elements of the information vector S have a value different from each other. On the contrary, in case of using the spatial diversity, since an identical signal is transmitted via a plurality of channel paths, the elements of the information vector S have a same value.

Of course, it is possible to consider a method of combining the spatial multiplexing and the spatial diversity with each other. In particular, for instance, a case that an identical signal is transmitted via 3 transmitting antennas using the spatial diversity and the rest of antennas transmit the signals different from each other using the spatial multiplexing can be considered as well.

In case that there exist $N_R$ number of receiving antenna, a reception signal of each antenna $y_1, y_2, \ldots, y_{N_R}$ can be represents as a vector y as follows.

$$y = [y_1, y_2, \ldots, y_{N_R}]^T \qquad \text{[Formula 6]}$$

Meanwhile, in case of modeling a channel in a MIMO antenna communication system, each channel can be classified according to an index of transmitting/receiving antenna. A channel passing through a transmitting antenna j and a receiving antenna i is represented as a $h_{ij}$. In this case, be cautious that the index of a reception antenna is preceding and the index of a transmission antenna is following in the order of the index of $h_{ij}$.

These channels can be represented as a vector or a matrix in a manner of binding a plurality of channels together. An example of representing a vector is described as follows.

Figure 11:
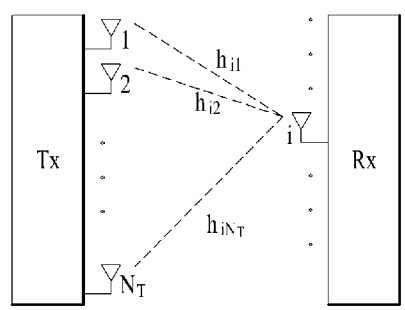
FIG. 11 is a diagram of channels from $N_T$ numbers of transmission antennas to a reception antenna i.

FIG. 11 is a diagram of channels from $N_T$ numbers of transmission antennas to a reception antenna i.

As depicted in FIG. 11, channels starting from the total $N_T$ number of transmission antennas to a reception antenna i can be represented as follows.

$$h_i^T = [h_{i1}, h_{i2}, \ldots, h_{iN_T}] \qquad \text{[Formula 7]}$$

And, in case that all channels passing through the $N_T$ number of transmission antennas and the $N_R$ number of reception antennas are represented by a matrix form such as the Formula 7, it can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{[Formula 8]}$$

Meanwhile, since an Additive White Gaussian Noise (AWGN) is added to a practical channel after the channel passes through the channel matrix H, the Additive White Gaussian Noise $n_1, n_2, \ldots, n_{N_R}$ added to each of the $N_R$ number of reception antennas can be represented as follows.

$$n = [n_1, n_2, \ldots, n_{N_R}]^T \qquad \text{[Formula 9]}$$

By modeling the aforementioned transmission signal, the reception signal, the channel, and the Additive White Gaussian Noise, each of the transmission signal, the reception signal, the channel, and the Additive White Gaussian Noise in a MIMO antenna communication system can be represented by a relationship as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Formula 10]}$$

Meanwhile, the number of row and column of the channel matrix H, which indicate a state of a channel, is determined by the number of transmission and reception antennas. As mentioned in the foregoing description, in the channel matrix H, the number of column becomes identical to the number of reception antenna $N_R$ and the number of row becomes identical to the number of transmission antenna $N_T$. In particular, the channel matrix H becomes $N_R \times N_T$ matrix.

In general, a rank of a matrix is defined by a minimum number of the numbers of row or column independent from each other. Hence, the rank of the matrix is configured not to be greater than the number of the row or the column. For instance, the rank of a channel matrix H (rank (H)) is limited as follows.

$$\text{rank}(H) \leq \min(N_T, N_R) \quad \text{[Formula 11]}$$

In particular, when Eigen value decomposition is performed on a matrix, a rank can be defined by the number of Eigen values, which is not a '0' among the Eigen values. Similarly, a rank can be defined by the number of singular values, which is not '0' when SVD (singular value decomposition) is performed on the matrix. Hence, a physical meaning of a rank of a channel matrix may indicate a maximum number capable of transmitting different information from each other in a given channel.

In the present specification, a 'rank' for MIMO transmission indicates the number of path capable of independently transmitting a signal on a specific timing point and a specific frequency resource. 'The number of layer' indicates the number of signal stream transmitted via each path. In general, since a transmitting end transmits layers in response to the number of rank used for transmitting a signal, the rank may have a same meaning with the number of layer unless there is a special comment.

2.3. Reference Signal (RS)

Since data is transmitted via a radio channel in a wireless communication system, a signal can be distorted in the midst of being transmitted. In order for a receiving end to receive the distorted signal properly, distortion of the received signal should be calibrated using channel information. In order to detect the channel information, a signal transmission method known to both a transmitting side and a receiving side and a method of detecting the channel information using an extent of distortion when a signal is transmitted on a channel are mainly used. The aforementioned signal is called a pilot signal or a reference signal (RS).

In case of transmitting and receiving data using a MIMO antenna, a channel state between a transmission antenna and a reception antenna should be detected to precisely receive a signal. Hence, each of the transmission antennas should have an individual reference signal.

A DL reference signal is classified into a common reference signal (CRS) shared by all user equipments in a cell and a dedicated reference signal (DRS) for a specific user equipment. Information necessary for performing demodulation and channel measurement can be provided using the reference signals.

A receiving side (i.e., a user equipment) measures a channel state from a CRS and feedbacks such a channel quality-related indicator as a CQI (channel quality indicator), a PMI (precoding matrix index), and/or an RI (rank indicator) to a transmitting side (i.e., a base station). The CRS is also called a cell-specific reference signal. On the contrary, such a reference signal related to the feedback of channel state information (CSI) as CQI/PMI/RI can be defined as a CSI-RS.

The DRS can be transmitted via resource elements in case that data demodulation is required on PDSCH. A user equipment may be able to receive whether the DRS exists via an upper layer and it is valid when the corresponding PDSCH is mapped only. The DRS can be called a UE-specific reference signal (UE-specific RS) or a demodulation reference signal (DMRS).

FIG. 12 is a diagram of a reference signal pattern mapped to a downlink resource block (RB) pair defined by 3GPP LTE system.

Referring to FIG. 12, a downlink resource block pair as a unit of mapping a reference signal can be represented as 'one subframe in time domain×12 subcarriers in frequency domain'. In particular, one resource block pair in a time axis (x axis) has a length of 14 OFDM symbols in case of a normal cyclic prefix (normal CP) (FIG. 12 (a)) and has a length of 12 OFDM symbols in case of an extended cyclic prefix (extended CP) (FIG. 12 (b)). Resource elements (Res) written on a resource block grid as '0', '1', '2', and '3' means CRS position of antenna port index '0', '1', '2', and '3', respectively. The resource elements written as 'D' mean the positions of the DRS.

In the following description, CRS is explained in more detail. The CRS is used to estimate a channel of a physical antenna and distributed to a whole frequency band as a reference signal capable of being commonly received by all user equipments situated within a cell. And, the CRS can be used for channel quality information (CSI) and a data demodulation.

The CRS is defined by various formats according to antenna arrangement of a transmitting side (base station). 3GPP LTE system (e.g., release-8) supports various antenna arrangements. A DL signal transmitting side includes 3 kinds of antenna arrangement such as 3 single transmission antennas, 2 transmission antennas, and 4 transmission antennas. In case that a base station uses a single transmission antenna, a reference signal for a single antenna port is arranged. In case that the base station uses 2 transmission antennas, the reference signal for 2 transmission antennas ports is arranged using a time division multiplexing (TDM) scheme and/or a frequency division multiplexing (FDM) scheme. In particular, different time resources and/or different frequency resources are allocated to the reference signal for the 2 antennas ports to distinguish each of the reference signals. Moreover, in case that the base station uses 4 transmission antennas, the reference signal for 4 transmission antennas ports is arranged using the TDM scheme and/or the FDM scheme. Channel information measured by a DL signal receiving side (user equipment) can be used to demodulate the data transmitted using such a transmission scheme as a single transmission antenna transmission, a transmission diversity, a closed-loop spatial multiplexing, an open-loop spatial multiplexing, or a multi-user MIMO.

In case that a MIMO antenna is supported, when a reference signal is transmitted from a specific antenna port, the reference signal is transmitted to the position of resource elements specified according to a reference signal pattern and is not transmitted to the position of resource elements specified for a different antenna port. In particular, reference signals between antennas different from each other do not overlap with each other.

A rule of mapping CRC to a resource block is defined as follows.

$$k = 6m + (v + v_{shift}) \bmod 6 \quad \text{[Formula 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In formula 12, k and l indicate a subcarrier index and a symbol index, respectively. P indicates an antenna port. $N_{symb}^{DL}$ indicates the number of OFDM symbol in one DL slot and $N_{RB}^{DL}$ indicates the number of radio resource allocated to a downlink. $n_s$ indicates a slot index and $N_{ID}^{cell}$ indicates a cell ID. A mod indicates modulo calculation. A position of the reference signal varies according to a $V_{shift}$ value in frequency domain. Since the $V_{shift}$ is subordinate to the cell ID, the position of the reference signal may have various frequency shift values according to a cell.

More specifically, in order to enhance channel estimation performance via the CRS, the position of the CRS can be shifted in frequency domain according to a cell. For instance, in case that a reference signal is positioned with an interval of 3 subcarriers, reference signals in one cell are assigned to a $3k^{th}$ subcarrier and the reference signal in a different cell is assigned to a $(3k+1)^{th}$ subcarrier. In a single antenna port point of view, reference signals are arranged with an interval of 6 resource elements in frequency domain and separated from the reference signal assigned to a different antenna port with an interval of 3 resource elements.

The reference signal in time domain is arranged starting from symbol index 0 of each slot with a constant interval. Time interval is differently defined according to a length of a cyclic prefix. In case of a normal cyclic prefix, the reference signal is positioned at the symbol index 0 and 4 of a slot. In case of an extended cyclic prefix, the reference signal is positioned at the symbol index 0 and 3 of a slot. The reference signal, which is required for the antenna port having a maximum value among the 2 antenna ports, is defined within an OFDM symbol. Hence, in case of a transmission of 4 transmission antennas, the reference signal for the reference signal antenna port 0 and 1 is positioned at the symbol index 0 and 4 of a slot (in case of the extended cyclic prefix, symbol index 0 and 3) and the reference signal for the reference signal antenna port 2 and 3 is positioned at the symbol index 1 of a slot. The position of the reference signal for the antenna port 2 and 3 in frequency domain is exchanged with each other in a $2^{nd}$ slot.

In the following description, DRS is explained in more detail. The DRS is used to demodulate data. In MIMO antenna transmission, a precoding weighted value used for a specific user equipment is used to estimate a channel, which corresponds to the transmission channel transmitted from each transmission antenna in a manner of being combined, without a change.

3GPP LTE system (e.g., release-8) supports maximum 4 transmission antennas and defines the DRS for a rank 1 beamforming. The DRS for the rank 1 beamforming indicates a reference signal for an antenna port index 5 as well.

A rule of mapping DRS to a resource block is defined as follows. Formula 13 indicates a case of a normal cyclic prefix and Formula 14 indicates a case of an extended cyclic prefix.

$$k = (k') \bmod N_{sc}^{RB} + N_{sc}^{RB} \cdot n_{PRB} \quad \text{[Formula 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Formula 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In the Formula 12 to Formula 14, k and p indicate a subcarrier index and an antenna port, respectively. $N_{RB}^{DL}$, $n_s$, and $N_{cell}^{ID}$ indicate the number of RBs allocated to a downlink, the number of slot index, and the number of cell ID, respectively. A position of the RS varies according to a value of $V_{shift}$ in the frequency domain point of view.

In Formula 13 and 14, k and l indicate a subcarrier index and a symbol index, respectively. P indicates an antenna port. $N_{SC}^{RB}$ indicates a size of a resource block in frequency domain and is represented as the number of subcarrier. $n^{PRB}$ indicates the number of physical resource block. $N_{RB}^{PDSCH}$ indicates a frequency band of a resource block for a PDSCH transmission. $n_s$ indicates a slot index and $N_{ID}^{cell}$ indicates a cell ID. mod indicates modulo calculation. A position of the reference signal varies according to a $V_{shift}$ value in frequency domain. Since the $V_{shift}$ is subordinate to the cell ID, the position of the reference signal may have various frequency shift values according to a cell.

2.4. CoMP (Coordinated Multi-Point Transmission and Reception)

To keep up with a request of LTE-advanced, a coordinated multi-point (hereinafter abbreviated CoMP) transmission is proposed to enhance system performance. The CoMP is also called a co-MIMO, a collaborative MIMO, a network MIMO, and the like. It is anticipated that the CoMP enhances the performance of a user equipment situated at a cell boundary and increases the throughput of an average cell (sector).

In general, inter-cell interference decreases the performance of a user equipment situated at a cell boundary and the throughput of an average cell (sector) in a multi-cell environment where a frequency reuse index corresponds to 1. In order to reduce the inter-cell interference, LTE system adopted a simple and passive method such as a fractional frequency reuse for a user equipment situated at a cell boundary to have a reasonable performance efficiency in an interference-limited environment. Yet, instead of reducing the use of frequency resource per each cell, a method of reusing the inter-cell interference or reducing the inter-cell interference with a signal (desired signal), which should be received by a user equipment, is more profitable. In order to achieve the aforementioned purpose, the CoMP transmission scheme can be applied.

The CoMP scheme applicable to a downlink can be classified into a JP (joint processing) scheme and a CS/CB (coordinated scheduling/beamforming) scheme.

According to the JP scheme, data can be used in each point (base station) of a CoMP unit. The CoMP unit means an aggregation of base stations used by the CoMP scheme. The JP scheme can be more classified into a joint transmission scheme and a dynamic cell selection scheme.

The joint transmission scheme means a scheme that signals are simultaneously transmitted on PDSCH from a plurality of points, which corresponds to a whole or a part of the CoMP unit. In particular, data transmitted to single user equipment can be simultaneously transmitted from a plurality of the transmission points. By using the joint transmission scheme, quality of a signal transmitted to a user equipment can be enhanced irrespective of whether the signal is a coherent signal or a non-coherent signal and may be able to actively eliminate the interference with a different user equipment.

The dynamic cell selection scheme means a scheme that a signal is transmitted on PDSCH from a single point. In particular, data transmitted to single user equipment on a specific time is transmitted from a single point and different points in the CoMP unit do not transmit data to the user equipment. The point transmitting the data to the user equipment can be dynamically selected.

According to the CS/CB scheme, the CoMP unit performs a beamforming in a manner of cooperating for a data transmission to a single user equipment. In particular, although the data is transmitted to the user equipment by a serving cell only, a user scheduling/beamforming can be determined by the cooperation of a plurality of the cells in the CoMP unit.

In case of UL, CoMP reception means to receive a signal transmitted by the cooperation between a plurality of the points, which are geographically separated from each other. The CoMP scheme applicable to the UL can be classified into a JR (joint reception) scheme and a CS/CB (coordinated scheduling/beamforming) scheme.

The JR scheme means a scheme receiving signals transmitted on PDSCH by a plurality of points, which corresponds to a whole or a part of the CoMP unit. According to the CS/CB scheme, although a signal transmitted on PDSCH is received by a single point only, a user scheduling/beamforming can be determined by the cooperation of a plurality of the cells in the CoMP unit.

2.5. Sounding Reference Signal (SRS)

An SRS is mainly used for a channel measurement to perform a frequency-selective scheduling of UL. The SRS is not related to a transmission of UL data and/or control information. Yet, the SRS may be non-limited to this and can be used for various different purposes to enhance power control or support various start-up functions of user equipments, which are not recently scheduled. Examples of the start-up functions may include an initial modulation and coding scheme (MCS), an initial power control for a data transmission, timing advance, and a frequency semi-selective scheduling. In this case, the frequency semi-selective scheduling indicates a scheduling that a frequency resource is selectively allocated to a first slot of a subframe and the frequency resource is allocated to a second slot in a manner of pseudo-randomly hopping to a different frequency.

And, the SRS can be used to measure DL channel quality under an assumption that a radio channel between an UL and a DL is reciprocal. This assumption is considerably effective in a time division duplex (TDD) system that the UL and the DL share an identical frequency spectrum and are separated from each other in time domain.

Subframes of the SRS transmitted by a certain user equipment in a cell can be represented by a cell-specific broadcast signal. A 4-bits cell-specific parameter 'srsSubframeConfiguration' indicates 15 available subframe arrangements capable of being transmitted by the SRS via each radio frame. Fluidity for coordination of an SRS overhead is provided by the arrangements according to a deployment scenario. A $16^{th}$ arrangement among the arrangements completely turns off a switch of the SRS in a cell. The $16^{th}$ arrangement is suitable for a serving cell mainly serving fast user equipments.

Figure 13:
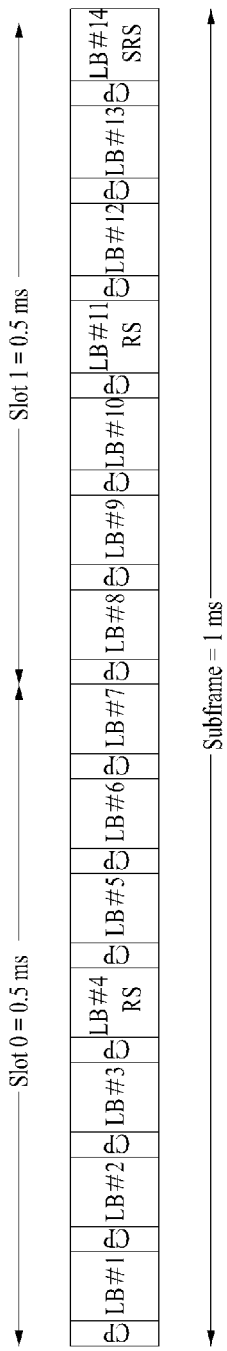
FIG. 13 indicates an uplink subframe including an SRS symbol.

FIG. 13 indicates an uplink subframe including an SRS symbol.

Referring to FIG. 13, the SRS is always transmitted via the last SC-FDMA symbol in an arranged subframe. Hence, the SRS and DMRS are positioned at an SC-FDMA symbol different from each other. PUSCH data transmission is not permitted on a specific SC-FDMA symbol, which is required for the SRS transmission. Consequently, in case that a sounding overhead is highest, in particular, even in case that an SRS symbol is included in all subframes, the sounding overhead does not exceed about 7%.

Each SRS symbol is generated by a basic sequence (a sequence set based on a random sequence or Zadoff-Ch (ZC)) for a given time unit and a frequency band. All user equipments within an identical cell use a same basic sequence. In this case, SRS transmission from a plurality of user equipments within the identical cell in a same time/frequency domain can be distinguished from each other in a manner that cyclic shifts different from each other of the basic sequence orthogonally cross. By assigning a basic sequence different from each other to each cell, SRS sequence from the cells different from each other can be distinguished. Yet, orthogonality between the basic sequences different from each other is not secured.

2.6. Relay Node (RN)

A relay node delivers data transceived between a base station and a user equipment via two different links (a backhaul link and an access link). The base station may include a donor cell. The relay node is connected to a wireless access network via the donor cell in wireless.

Meanwhile, regarding a band (or spectrum) use of a relay node, one case that a backhaul link and an access link operate on a same frequency band may correspond to 'in-band' and another case that the backhaul link and the access link operate on a frequency band different from each other may correspond to 'out-band'. In both of the above-mentioned two cases, it is necessary for a user equipment (hereinafter, a legacy user equipment) operating in a legacy LTE system (e.g., Release-8) to access a donor cell.

Relay nodes may be classified into a transparent relay node and a non-transparent relay node depending on whether a user equipment recognizes the relay node. In particular, the 'transparent' may mean a case that a user equipment is unable to recognize whether the user equipment is communicating with a network via the relay node. And, the 'non-transparent' may mean a case that the user equipment is able to recognize whether the user equipment is communicating with the network via the relay node.

Regarding controls of a relay node, relay nodes may be classified into a relay node configured as a part of a donor cell and a relay node capable of controlling a cell by itself.

Although the relay node configured as a part of the donor cell may have a relay node identity (ID), the relay node does not have a cell identity of its own. If at least a part of RRM (Radio Resource Management) is controlled by a base station to which the donor cell belongs thereto, despite that the rest of the RRM is located at the relay node, the above-mentioned relay node may be considered as a relay node configured as a part of the donor cell. Preferably, this relay node may be able to support a legacy user equipment. For example, smart repeaters, decode-and-forward relay nodes, various types of L2 ($2^{nd}$ layer) relay nodes, and a type-2 relay node correspond to the above-mentioned relay node.

In case of the relay node configured to control a cell by itself, the relay node controls one or a plurality of cells and a unique physical layer cell identifier is provided to each of the cells controlled by the relay node. And, each of the cells controlled by the relay node can use an identical RRM mechanism. In aspect of a user equipment, there is no difference between accessing a cell controlled by the relay node and accessing a cell controlled by a general base station. The cell controlled by the above-mentioned relay node may be able to support a legacy user equipment. For example, a self-backhauling relay node, an L3 (3rd layer) relay node, a type-1 relay node, and a type-1a relay node may correspond to the above-mentioned relay node.

The type-1 relay node corresponds to an in-band relay node and controls a plurality of cells. And, a user equipment may consider each of a plurality of the cells as an individual cell discriminated from a donor cell. Moreover, each of a plurality of the cells has a physical cell ID (defined in LTE Release-8) of its own and the relay node may be able to transmit a synchronization channel of the relay node, a reference signal and the like. In case of a single-cell operation, the user equipment may directly receive scheduling information and a HARQ feedback from the relay node and may be able to transmit a control channel (scheduling request (SR), CQI, ACK/NACK, etc.) of the user equipment to the relay node. Moreover, legacy user equipments (e.g., user equipments operating in LTE Release-8 system) may consider the type-1 relay node as a legacy base station (e.g., a base station operating according to the LTE Release-8 system). In particular, the type-1 relay node has backward compatibility. Meanwhile, in the aspect of the user equipments operating according to the LTE-A system, since the type-1 relay node is considered as a base station different from the legacy base station, performance can be enhanced.

Besides the operation of out-band, the type-1a relay node has the same features of the aforementioned type-1 relay node. The operation of the type-1a relay node can be configured to minimize (or eliminate) the influence on L1 (first layer) operation.

The type-2 relay node corresponds to an in-band relay node and does not have a separate physical cell ID. Hence, the type-2 relay node does not form a new cell. The type-2 relay node is transparent to a legacy user equipment and the legacy user equipment is unable to recognize the presence of the type-2 relay node. Although the type-2 relay node is able to transmit PDSCH, it may not transmit at least CRS and PDCCH.

Meanwhile, In order to make the relay node perform in-band operation, a part of resources in time-frequency space must be reserved for a backhaul link and the part of resources can be configured not to be used for an access link. This configuration may be called 'resource partitioning'.

A general principle related to the resource partitioning in a relay node may be described as follows. First of all, a backhaul downlink and an access downlink may be multiplexed together on a single carrier frequency by Time Division Multiplexing (TDM) scheme (i.e., either the backhaul downlink or the access downlink is activated on a specific time.). Similarly, a backhaul uplink and an access uplink may be multiplexed together on a single carrier frequency by TDM scheme (i.e., either the backhaul uplink or the access uplink can be activated on a specific time).

Regarding the backhaul link multiplexing in the FDD, a backhaul downlink transmission can be performed on a downlink frequency band, and a backhaul uplink transmission can be performed on an uplink frequency band. Regarding the backhaul link multiplexing in the TDD, a backhaul downlink transmission can be performed in a downlink subframe of a base station or a relay node, and a backhaul uplink transmission can be performed in an uplink subframe of the base station or the relay node.

In case of an in-band relay node, for example, if both a backhaul downlink reception from a base station and an access downlink transmission to a user equipment are simultaneously performed on an identical frequency band, a signal interference may occur at a receiving end of the relay node due to a signal transmitted from a transmitting end of the relay node. In particular, signal interference or RF jamming may occur at an RF front-end of the relay node. Similarly, if both an access uplink reception from a user equipment and a backhaul uplink transmission to a base station are simultaneously performed on an identical frequency band, signal interference may occur at the RF front-end of the relay node.

Therefore, it may be difficult to implement the simultaneous transmission and reception on a single frequency band at a relay node unless a sufficient separation between a received signal and a transmitted signal is provided (e.g., a transmitting antenna and a receiving antenna are installed in a manner of being sufficiently spaced apart from each other (e.g., installed on/under the ground)).

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 14:
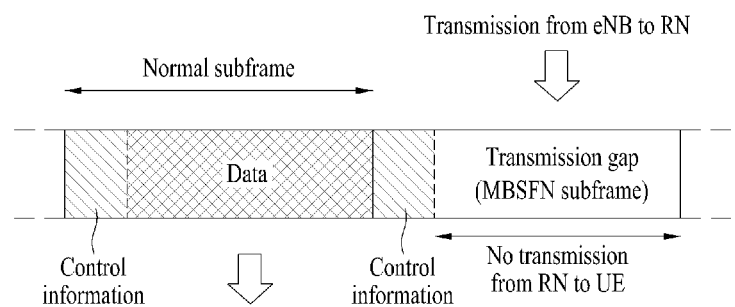
FIG. 14 is a diagram for an example of a relay node resource partition.

FIG. 14 is a diagram for an example of a relay node resource partition.

Referring to FIG. 14, a first subframe is a normal subframe and a downlink (i.e., an access down link) control signal and data are transmitted from a relay node to a user equipment. A $2^{nd}$ subframe is an MBSFN subframe. The control signal is transmitted from the relay node to the user equipment in a control region of the DL subframe. Yet, no transmission is performed from the relay node to the user equipment in the rest of the region of the DL subframe. In this case, since a legacy user equipment is configured to expect a transmission of a physical downlink control channel (PDCCH) in all DL subframes (i.e., since it is necessary for the relay node to support the legacy user equipments within the region of the relay node to make the legacy user equipments perform a measuring function in a manner of receiving the PDCCH on every subframe), it is necessary to transmit the PDCCH in all DL subframes for a correct operation of the legacy user equipment. Hence, even in the subframe configured for the downlink (i.e., backhaul downlink) transmission from the base station to the relay node, it is necessary for the relay node not to receive a backhaul downlink but to perform an access downlink transmission in the first N (N is 1, 2, or 3) number of OFDM symbol periods of the subframe. Regarding this, since the PDCCH is transmitted from the relay node to the user equipment in the control region of the 2nd subframe, backward compatibility for the legacy user equipment serving in the relay node may be provided. In the rest of the region of the $2^{nd}$ subframe, the relay node may be able to receive a transmission from the base station while no transmission is performed from the relay node to the user equipment. Therefore, by using the resource partitioning, it may be able to make the access downlink transmission and the backhaul downlink reception not to be performed at the same time in an in-band relay node.

The $2^{nd}$ subframe using an MBSFN subframe is explained in detail. A control region of the $2^{nd}$ subframe may be called a relay node non-hearing interval. The relay node non-hearing interval means an interval for the relay node to transmit an access downlink signal without receiving a backhaul downlink signal. This interval can be configured by the length of 1, 2, or 3 OFDMs. The relay node performs an access downlink transmission to a user equipment in the relay node non-hearing interval and may be able to receive a backhaul downlink from a base station in the rest of the region. At this time, since the relay node is unable to perform a transmission and reception at the same time on an identical frequency band, it takes time for the relay node to change from a transmitting mode to a receiving mode. Thus, it is necessary to configure a guard time (GT) in a first prescribed part of the backhaul downlink receiving region in order for the relay node to switch from the receiving mode to the transmitting mode. Similarly, in case that the relay node operates to receive the backhaul link from the base station and to transmit the access downlink to the user equipment, it may be able to configure the guard time (GT) in order for the relay node to switch from the receiving mode to the transmitting mode. The length of the guard time may be given by a value of the time domain. For instance, the length of the guard time may be given by the value of k (k≥1) number of time sample (Ts) or may be configured by the length of one or more OFDM symbols. Or, the guard time of the last part of the subframe may not be defined or configured in case that the relay node backhaul downlink subframe is contiguously configured or according to a prescribed subframe timing alignment relation. In order to maintain backward compatibility, the guard time can be defined on the frequency domain configured for the backhaul downlink subframe transmission only (if the guard time is configured in the access downlink interval, a legacy user equipment may not be supported). The relay node may be able to receive PDCCH and PDSCH in the backhaul downlink reception interval except the guard time. This may be represented as an R-PDCCH (relay-PDCCH) and an R-PDSCH (relay-PDSCH) in a meaning of a relay node dedicated physical channel.

2.7. Carrier Aggregation Environment 2.7.1. The Generals of Carrier Aggregation

Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment.

In the following description of embodiments, a primary component carrier (PCC) may be usable as having the same meaning of PCell and a secondary component carrier (SCC) may be usable as having the same meaning of SCell.

Figure 15:
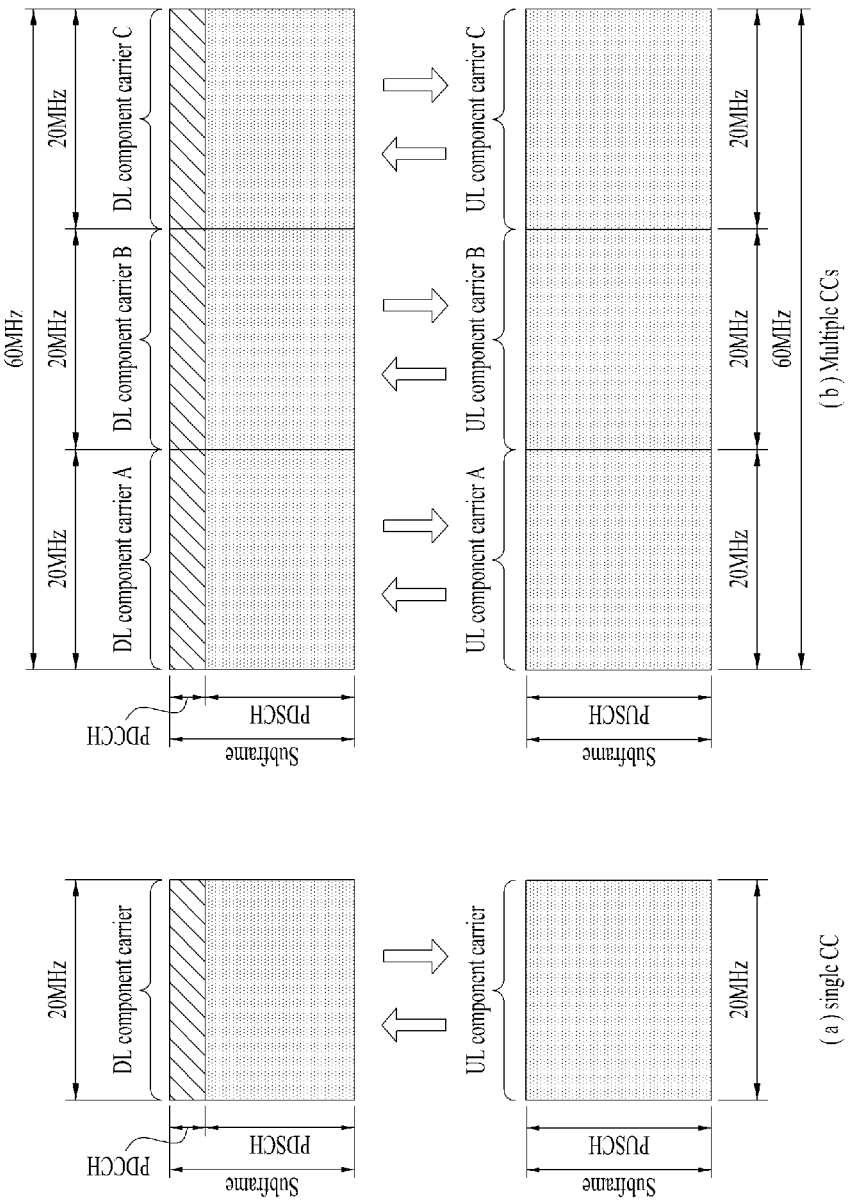
FIG. 15 is a diagram for an example of a carrier aggregation used for a component carrier (CC) of LTE system and LTE-A system.

FIG. 15 is a diagram for an example of a carrier aggregation used for a component carrier (CC) of LTE system and LTE-A system.

FIG. 15 (a) shows a single carrier structure used by LTE system. Component carriers include DL CC and UL CC. One component carrier may have a frequency range of 20 MHz.

FIG. 15 (b) shows a carrier aggregation structure used by LTE-A system. Referring to FIG. 6 (b), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, L≤M≤N) to a user equipment. In doing so, the user equipment may be able to monitor the limited M DL CCs only and receive DL signals. Moreover, a network may be able to assign primary DL CC to the user equipment in a manner of prioritizing L DL CCs (where, L≤M≤N). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or a system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data, and a UL/DL CC for carrying HARQ ACK/NACK signal.

2.7.2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL C set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 16:
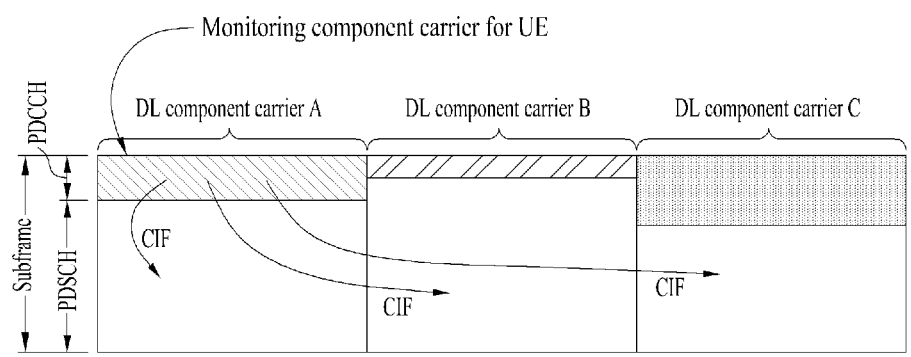
FIG. 16 is a diagram for a subframe structure of LTE-A system according to a cross carrier scheduling.

FIG. 16 is a diagram for a subframe structure of LTE-A system according to a cross carrier scheduling.

Referring to FIG. 16, a DL subframe for an LTE-A user equipment represents a case that 3 DL CCs are combined and that DL CC 'A' is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In this case, DL CC 'B' or DL CC 'C', which is not set as the PDCCH monitoring DL CC, does not transmit PDCCH.

3. Method of Allocating Radio Resource

In case that WLAN or LTE/LTE-A UE operates in a transmitting mode in a white space band, the present invention is proposed to control neighboring channel interference caused by out of band emission power of a transmitting end to minimize performance degradation caused by the interference capable of being received by a WLAN or LTE/LTE-A receiver. In particular, neighboring band leaked interference caused by the out of band emission power is reduced in a manner that transmitted data allocation on a transmitting band channel is restricted by frequency domain. By doing so, impacts, which affects a neighboring reception band affected by a transmission of such a UE as the WLAN, LTE/LTE-A, or the like in the WS, can be minimized and a transmitter and receiver can coexist together without any problem.

In the following description, for clarity, a TV white space is explained, by which the present invention may be non-limited. It is apparent that the present invention is also applicable to an unlicensed frequency band (unlicensed band) to which a specific system or a device is not permitted to exclusively use.

Currently, in case that a wireless LAN (WLAN) service or LTE/LTE-A service, which corresponds to a cellular service, is performed in a TV WS band, out of band unwanted emission emitted by a servicing UE may affect reception performance of a neighboring WLAN, LTE/LTE-receiver, or a DTV receiver.

In particular, if the WLAN or the LTE/LTE-A UE performs transmission/reception by a database scheme or a carrier sensing scheme in the TV WS band, a transmission/reception channel band may correspond to a part of empty unit channel (e.g., 6 MHz) among UHF reception band (e.g., 470~698 MHz) of a DTV. And, a UE transmitting and receiving in the channel band is highly likely to be not applied by such an RF front-end filter as a duplex filter. Hence, out of band emission property caused by an RF filter should be separately managed. In particular, if there is such a front-end filter as a duplex filter configured to manage a whole of a transmitting/receiving band, out of band emission inputted from a transmission antenna port to a reception antenna port is decreased as much as about 45~50 dB compared to a transmission band in general. Yet, reception band protection gain due to the power decrease is not highly likely to be enjoyed by the UEs operating in the TV WS band.

Figure 17:
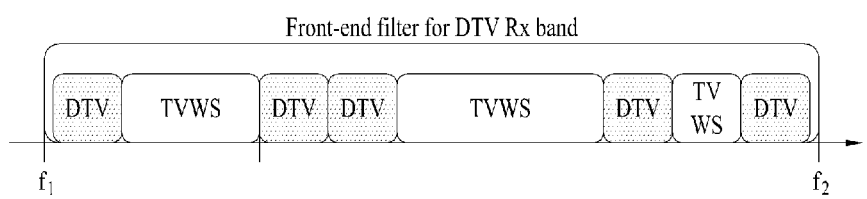
FIG. 17 is a diagram for an example of coexisting with such a different service as a DTV via an available channel in a DTV reception band.

FIG. 17 is a diagram for an example of coexisting with such a different service as a DTV via an available channel in a DTV reception band.

Referring to FIG. 17, there may exist a plurality of available channels (bands represented by TV WS in FIG. 17) not used by a DTV in a reception band of the DTV and wireless LAN or LTE/LTE-A UE can use a band assigned to the wireless LAN or LTE/LTE-A UE among a plurality of the available channels. In this case, the wireless LAN or LTE/LTE-A UE firstly performs a front-end filtering, which manages a whole of the TV WS band, and may be then able to coexist with the DTV or a different wireless LAN device without a help of an RF filtering in a manner of receiving data on the available channel from a base station.

Figure 18:
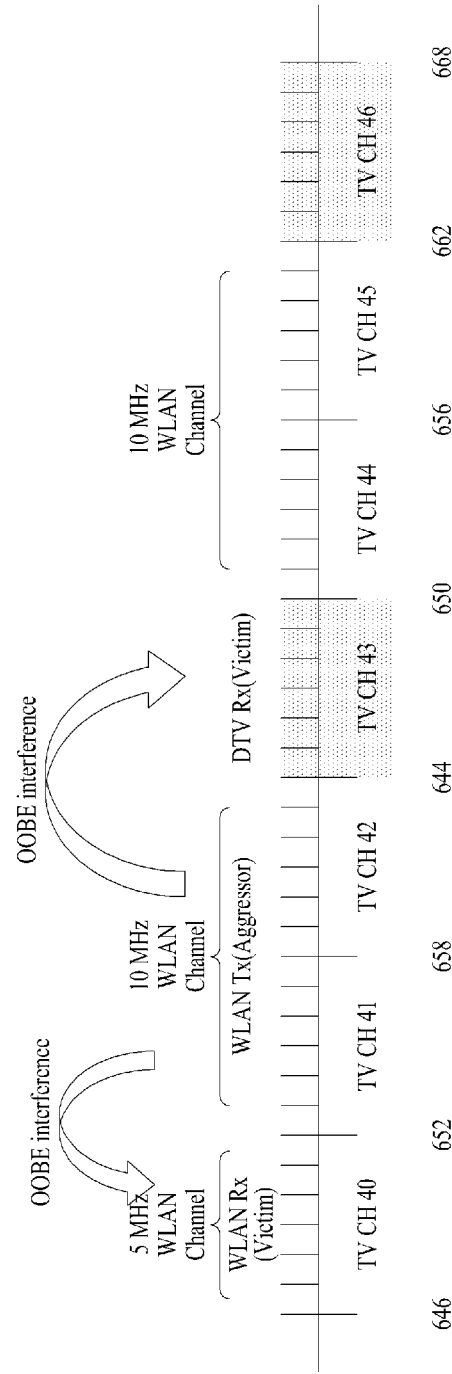
FIG. 18 is a diagram for an example of interference impact caused by a wireless local area network or LTE/LTE-A transmission in case that the wireless local area network or LTE/LTE-A service coexists with a DTV service.

FIG. 18 is a diagram for an example of interference impact caused by a wireless local area network or LTE/LTE-A transmission in case that the wireless local area network or LTE/LTE-A service coexists with a DTV service.

Referring to FIG. 18, 644~650 MHz frequency band and 662~668 MHz frequency band in a DTV reception band are used by a DTV, which is a licensed device, as a channel 43 and a channel 46, respectively. According to IEEE 802. 11 a standard, a wireless LAN UE supports at least one of 5 MHz, 10 MHz, and 20 MHz. If a carrier aggregation is not supported, An LTE/LTE-A UE supports one of 6 channel bandwidths including 1.4 MHz, 3 MHz, 5 MHz, 10 MHz, 15 MHz, 20 MHz, and the like. If the carrier aggregation is supported, the LTE/LTE-A UE theoretically supports up to 100 MHz. Yet, in consideration of a band secured by a practical service provider, the LTE/LTE-A UE can occupy a bandwidth of up to 40 MHz. The LTE/LTE-A UE can support 5 MHz, 10 MHz, or higher frequency bandwidth in a manner of configuring the 5 MHz as a basic bandwidth depending on whether several contiguous TV WS channels are not used by a licensed device. FIG. 18 depicts an example that a wireless UE or an LTE/LTE-A UE operates in a reception mode using a frequency band of 5 MHz on a channel 40 and the wireless UE or the LTE/LTE-A UE operates in a transmission mode using a frequency band of 10 MHz on a channel 41 and channel 42.

As mentioned in the foregoing description, if the wireless UE or the LTE/LTE-A UE coexists with a DTV reception service without a help of a front-end filter, due to out of band emission (OOBE) caused by a transmission of the wireless UE or the LTE/LTE-A UE, interference may affect reception of a DTV receiver or reception of a different wireless LAN UE or LTE/LTE-A UE. FIG. 18 depicts examples of interference affecting reception of a wireless LAN or LTE/LTE-A UE operating in a reception mode on a channel 40 or reception of a DTV receiver on a channel 43 due to the out of band emission (OOBE) caused by a transmission of the wireless LAN or LTE/LTA-A UE operating in a transmission mode on a channel 41 and a channel 42. The interference impact can be mainly divided into an ACLR (adjacent channel leakage ratio), which corresponds to an out of band emission property for a neighbor band of a band used by the wireless LAN or LTE/LTE-A UE, ACS (adjacent channel selectivity), which enables a receiving end to reliably receive a signal of the receiving end when there exist interference in a neighbor band, and an impact of IM (inter-modulation) that two or more interference signals are interfering a reception band.

In order to solve the aforementioned problem, the present invention proposes a method of a network scheduling for controlling interference leaking to an out of band to protect DTV reception performance in case that a wireless LAN UE or LTE/LTE-A UE operates without a help of a front-end filter in a DTV reception band.

Figure 19:
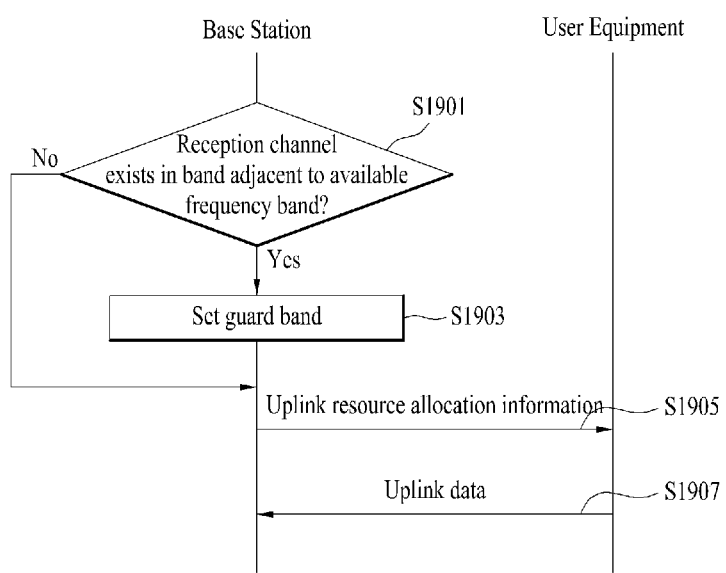
FIG. 19 is a flowchart for an example of a method of allocating an uplink resource to control interference emitted to a neighboring band according to one embodiment of the present invention.

FIG. 19 is a flowchart for an example of a method of allocating an uplink resource to control interference emitted to a neighboring band according to one embodiment of the present invention.

Referring to FIG. 19, a base station checks whether a reception channel exists in a neighboring band of an available frequency band assigned to a user equipment [S1901]. In this case, the available frequency band assigned to the user equipment can be configured with at least one unit channel of a corresponding unlicensed band (e.g., DTV reception band).

The base station can check whether a reception channel exists in a band adjacent to an available frequency band assigned to a user equipment in a manner of receiving information identified by a network based on a database from the network or information shared by a neighboring base station. Although it is not depicted in FIG. 19, the base station can check whether a reception channel exists in a band adjacent to an available frequency band assigned to a user equipment in a manner of receiving information on the band adjacent to the available frequency band assigned to the corresponding user equipment from the user equipment. And, the base station can check whether a reception channel exists in a band adjacent to an available frequency band assigned to a user equipment in a manner of combining at least one of the aforementioned schemes.

First of all, a method of judging whether a reception channel exists in a band adjacent to an available frequency band assigned to a user equipment by a network based on a database is explained. A base station can check a frequency used by a licensed device in a corresponding unlicensed band using a database. For instance, in case of a TV WS band, a network can check a frequency assigned to a DTV receiver in an area serviced by the network. As mentioned in the foregoing description, the TV WS band may vary depending on each country and a network can check information on a frequency band assigned to a DTV receiver according to a corresponding area. Hence, a base station can check whether a reception channel exist in a band adjacent to an available frequency band assigned to a user equipment in a manner of receiving information identified by a network based on a database.

And, each of base stations on a network can check usage information of a unlicensed device as well as a licensed device in a band adjacent to an available frequency band assigned to a user equipment in a coverage (cell or BSA) serviced by each of the base stations. By sharing the usage information according to frequency band between the base stations, each of the base stations can check whether the band adjacent to the available frequency band assigned to a user equipment is used. For instance, in case of a TV WS band, a base station can check whether the band adjacent to the available frequency band assigned to a user equipment is used by such an unlicensed device as a wireless LAN or LTE/LTE-A UE and the like as well as a DTV receiver via the information shared by an adjacent base station.

And, a user equipment senses whether a reception channel of a licensed device or an unlicensed device exists in the band adjacent to the available frequency band assigned to the user equipment and may be then able to transmit information on the reception channel sensed in the band adjacent to the available frequency band assigned to the user equipment. For instance, the user equipment measures power in a manner of scanning x number of adjacent bands on the basis of the frequency band assigned to the user equipment among the total of DTV reception bands and may be then able to check whether a different device performs a reception service in an adjacent band in a manner of comparing the measured power value with a reference value for a reception area. In this case, the user equipment may perform a frequency scan according to a basic frequency unit in a corresponding unlicensed band and the number of adjacent bands to be scanned can be determined in advance. If a power measured value is greater than a specific threshold value (Th-low [dBm]), the user equipment can judge that a different device performs a reception service in the adjacent bands of if a power measured value is less than a specific threshold value (Th-low [dBm]), the user equipment can judge that a different device performs a reception service in the adjacent bands as well. And, if a power measure value exists in a specific range, e.g., between Th-low {dBm} and Th-high [dBm], the user equipment can judge that a different device performs a reception service in the adjacent bands as well. In this case, a reference value for a reception area may vary depending on a service provided by a corresponding unlicensed band. For instance, a reference value for a reception area may vary depending on each service band including a DTV reception band, an ISM (industrial scientific and medical equipment), and the like. Hence, the user equipment senses whether a reception channel exists in the band adjacent to the available frequency band assigned to the user equipment and transmits sensed information to the base station. By doing so, the base station can judge whether a reception channel exists in the band adjacent to the available frequency band assigned to the user equipment. In particular, the information on whether a reception band of a different device exists in the band adjacent to the available frequency band assigned to the user equipment, which is transmitted to the base station by the user equipment, means information indicating whether a power value measured in the adjacent band is within a range of a predetermined reference value.

Having judged a reception channel existing in the band adjacent to the available frequency band assigned to the user equipment, the base station configures a prescribed band of the corresponding available frequency band as a guard band [S1903]. For instance, if the base station judges that a DTV receiver, a wireless LAN UE, or a LTE/LTE-A UE receives a service in the band adjacent to the available frequency band assigned to the user equipment, the base station can reduce interference impact caused by an out of band emission in a manner of allocating all radio resources to a part of the frequency bands among the available frequency band assigned to the user equipment only and assigning a guard band to the rest of frequency bands. In particular, if a reception channel exists in the band adjacent to the available frequency band assigned to the user equipment, the base station can restrain a prescribed part of the available frequency band assigned to the user equipment from being allocated by a radio resource.

Figure 20:
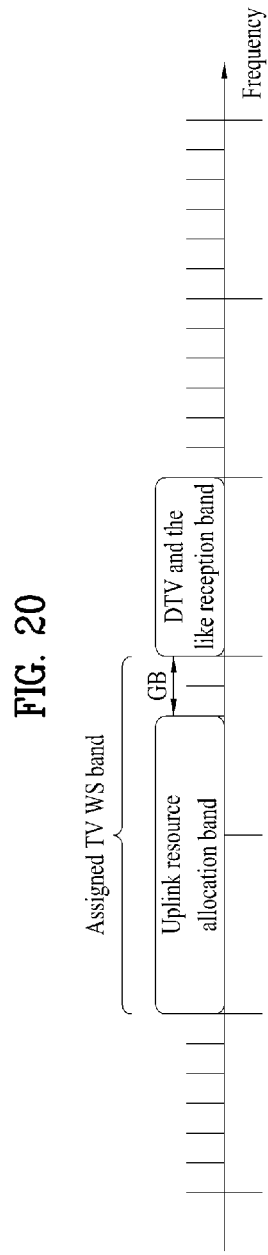
FIG. 20 is a diagram for an example of configuring a guard band in an available frequency band according to one embodiment of the present invention.

FIG. 20 is a diagram for an example of configuring a guard band in an available frequency band according to one embodiment of the present invention.

Referring to FIG. 20, if a reception band of a DTV receiver, a WLAN UE, or a LTE/LTE-A UE is sensed in the right of an available frequency band (a TV WS band in FIG. 20), a prescribed frequency band of the right of the assigned band is assigned as a guard band (GB) and a resource is not allocated to the prescribed frequency band. An uplink radio resource is allocated to the rest of the frequency bands, which are not configured as the guard band. Yet, as depicted in FIG. 20, if a reception band of a DTV receiver, a WLAN UE, or a LTE/LTE-A UE is not sensed in the left of the TV WS bandwidth assigned to a user equipment, it is able to maximize usage efficiency of a given band by not configuring a guard band. A base station can determine whether a guard band is configured or not in consideration of a position of an available frequency band (or radio resource) allocated to a user equipment.

A method of calculating a size of a guard band is explained. Since a value of out of band emission is determined according to an amount of radio resource assigned to a user equipment in frequency domain and transmit power of the corresponding user equipment, a size of a guard band can be obtained by a function of the radio resource assigned to the corresponding user equipment and the transmit power of the corresponding user equipment. In particular, the size of the guard band can be calculated by a function of an uplink resource allocation bandwidth and transmit power of the band. It is preferable to design the function on the basis of an interference level not greater than an emitted interference affecting reception of a DTV receiver, a WLAN UE, or a LTE/LTE-A UE. In other word, a radio resource allocated to a user equipment and a value of transmit power of the corresponding user equipment can draw an amount of interference affecting a reception channel of an adjacent band using the function. And, a size of a guard band can be calculated using the amount of interference affecting a reception channel of an adjacent band.

In case that a reception is sensed in a band adjacent to the available frequency band assigned to the user equipment, if it is judged that power of a transmission UE may affect reception performance of the adjacent band under an assumption of a worst case scenario, a guard band is calculated under the scenario and a resource is not allocated to the guard band. In particular, a size of a guard band can be calculated according to an impact affecting the reception performance of the adjacent band affected by a transmission of a user equipment under an assumption that the user equipment transmits with maximum power. Yet, although a reception is sensed in the adjacent band, if a transmission of the user equipment in a current available frequency band corresponds to transmit power as much as not affecting the reception performance of a receiver of the adjacent band, all radio resource can be allocated to the whole of the available frequency band.

Referring to FIG. 19 again, having configured a prescribed part of the available frequency band assigned to the user equipment as a guard band, the base station transmits information on frequency band not configured as the guard band, i.e., uplink resource allocation information to the user equipment [S1905]. In this case, the user equipment can check an uplink resource allocated to the user equipment in a manner that the base station transmits the information on the guard band configured in the available frequency band assigned to the user equipment.

On the other hand, if the base station judges that a reception channel does not exist in the band adjacent to the available frequency band assigned to the user equipment in the step S1901, the base station does not configure a guard band, allocates an uplink resource to the user equipment in the whole of the available frequency bands, and may transmit uplink resource allocation information to the user equipment as well.

Subsequently, having transmitted the uplink resource allocation information to the user equipment, the base station receives uplink data from the user equipment via a corresponding resource [S1907].

4. The Generals of Device to which the Present Invention is Applicable

Figure 21:
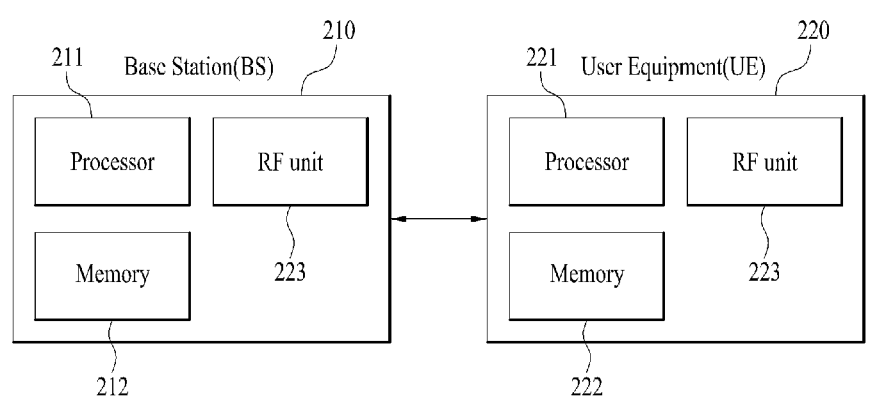
FIG. 21 is a block diagram of a wireless communication device according to one embodiment of the present invention.

FIG. 21 is a block diagram of a wireless communication device according to one embodiment of the present invention.

Referring to FIG. 21, a wireless communication system may include a base station (BS) 210 and a plurality of user equipments (UEs) 220 located within an area of the base station 210.

The base station 210 may include a processor 211, a memory 212 and an RF (radio frequency) unit 213. The processor 211 implements the proposed functions, processes and/or methods. Layers of a radio interface protocol can be implemented by the processor 211. The memory 212 is connected with the processor 211 and then stores various kinds of information to drive the processor 211. The RF unit 213 is connected with the processor 211 and then transmits and/or receives radio signals.

The user equipment 220 includes a processor 221, a memory 222 and an RF unit 223. The processor 221 implements the proposed functions, processes and/or methods. Layers of a radio interface protocol can be implemented by the processor 221. The memory 222 is connected with the processor 221 and then stores various kinds of information to drive the processor 221. The RF unit 223 is connected with the processor 221 and then transmits and/or receives radio signals.

The memory 212/222 may be provided within or outside the processor 211/221. And, the memory 212/222 may be connected with the processor 211/221 via various kinds of well-known means. Moreover, the base station 210 and/or the user equipment 220 may have a single antenna or multiple antennas.

In the following description, the processor 211/221 is explained in more detail among the aforementioned each component of the base station and the user equipment. The processor 211/221 may have multiple layers. Among the multiple layers, a data link layer (DLL), in particular, a MAC sublayer and a physical layer are depicted in more detail.

Figure 22:
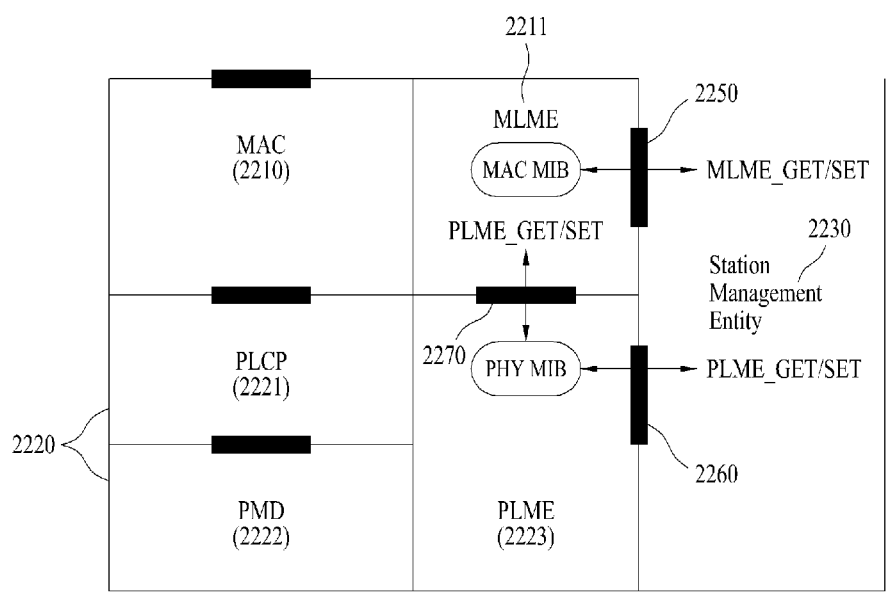
FIG. 22 is a diagram for an example of a processor structure of a base station or a user equipment according to one embodiment of the present invention.

FIG. 22 is a diagram for an example of a processor structure of a base station or a user equipment according to one embodiment of the present invention.

Referring to FIG. 22, a physical layer 2220 may include a PLCP (physical layer convergence procedure) entity 2221 and a PMD (physical medium dependent) entity 2222. Both the MAC sublayer 2210 and the physical layer 2220 can include a conceptual management entity and can be called an MLME (MAC sublayer management entity) 2211 and a PLME (physical layer management entity) 2223, respectively. The entities 2211/2221 provide a layer management service interface via an operation of a layer management function.

In order to provide a precise MAC operation, an SME (station management entity) 2230 can exist within each user equipment. The SME 2230 is a management entity independent of each layer. The SME collects layer-based state information from various layer management entities and configures values of specific parameters of each layer. The SME 2230 may perform this function on behalf of general system management entities and can implement a standard management protocol.

The aforementioned various entities can interact with each other with various methods. FIG. 22 indicates an example of exchanging GET/SET primitive. An XX-GET.request primitive is used to request a value of MIB (management information base) attribute and an XX-GET.confirm primitive returns a value of a corresponding MIB attribute in case that a status corresponds to 'SUCCESS'. Otherwise, the XX-GET.confirm primitive returns in a manner of indicating an error sign in a status field. XX-SET.request primitive is used to request that a designated MIB attribute is configured with a given value. If the MIB attribute means a specific operation request, the request may indicate a request of the specific operation. And, in case that a status corresponds to 'SUCCESS', XX-SET.confirm primitive means the MIB attribute configured with a requested value. Otherwise, a status field indicates an error situation. If the MIB attribute means a specific operation, this primitive can confirm that a corresponding operation is performed.

As depicted in FIG. 22, the MLME 2211, the SME 2230, the PLME 2223, and the SME 2230 can exchange the various primitives via MLME_SAP (MLME_service access point 2250) and PLME_SAP (PLME_service access point 2260), respectively. And, a primitive can be exchanged between the MLME 2211 and the PLME via MLME-PLME_SAP (MLME-PLME_service access point 2270).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a data transceiving method in a wireless access system according to the present invention is described with reference to examples applied to 3GPP LTE system or IEEE 802 system, it may be applicable to various kinds of wireless access systems as well as the 3GPP LTE system or the IEEE 802 system.

What is claimed is:

1. A method of allocating a radio resource in a wireless access system supporting a television white space (TVWS) band, the method performed by a base station and comprising:
assigning an available frequency band not used by a licensed device among a plurality of available frequency bands of the TVWS band to a user equipment;
if a reception band of a different device exists in a band adjacent to the assigned available frequency band, setting a guard band to a part of the band adjacent to the assigned available frequency band;
allocating the radio resource to the user equipment in the assigned available frequency band except the guard band;
receiving uplink data from the user equipment via the radio resource; and
receiving, from the user equipment or a network, information on whether the reception band of the different device exists in the band adjacent to the assigned available frequency band,
wherein the guard band is determined using an allocation position of the radio resource, an amount of the radio resource, and transmit power of the user equipment.

2. The method of claim 1, wherein the information on whether the reception band of the different device exists in the band adjacent to the assigned available frequency band received from the user equipment indicates whether a power value measured for the band adjacent to the assigned available frequency band is within a predetermined range.

3. The method of claim 1, further comprising determining whether the reception band of the different device exists in the band adjacent to the assigned available frequency band via usage information of the TVWS band shared by a different base station.

4. The method of claim 1, wherein the guard band is configured in the part of the band adjacent to a prescribed one band among both bands adjacent to the assigned available frequency band.

5. The method of claim 1, wherein a transmit power of the user equipment corresponds to maximum transmit power permitted to the user equipment.

6. A base station configured to allocate a radio resource in a wireless access system supporting a television white space (TVWS) band, the base station comprising:
a radio frequency (RF) unit configured to transmit and receive a radio signal; and
a processor operably coupled with the RF unit,
wherein if an available frequency band not used by a licensed band among a plurality of available frequency bands of the TVWS band is assigned to a user equipment and a reception band of a different device exists in a band adjacent to the assigned available frequency band, the processor is further configured to:
set a guard band to a part of the band adjacent to the assigned available frequency band,
allocate the radio resource to the user equipment in the assigned available frequency band except the guard band,
receive uplink data from the user equipment via the radio resource, and
receive, from the user equipment or a network, information on whether the reception band of the different device exists in the band adjacent to the assigned available frequency band,
wherein the guard band is determined by the processor using an allocation position of the radio resource, an amount of the radio resource, and transmit power of the user equipment.

7. The base station of the claim 6, wherein the information on whether the reception band of the different device exists in the band adjacent to the assigned available frequency band received from the user equipment indicates whether a power value measured for the band adjacent to the assigned available frequency band is within a predetermined range.

8. The base station of claim 6, wherein whether the reception band of the different device exists in the band adjacent to the assigned available frequency band is determined via usage information of the TVWS band shared by a different base station.

9. The base station of claim 6, wherein the guard band is set to the part of the band adjacent to a prescribed one band only among both bands adjacent to the assigned available frequency band.

10. The base station of claim 6, wherein a transmit power of the user equipment corresponds to maximum transmit power permitted to the user equipment.

* * * * *